(12) United States Patent
Buchmann et al.

(10) Patent No.: US 8,139,430 B2
(45) Date of Patent: Mar. 20, 2012

(54) POWER-ON INITIALIZATION AND TEST FOR A CASCADE INTERCONNECT MEMORY SYSTEM

(75) Inventors: Peter L. Buchmann, Wald (CH); Frank D. Ferraiolo, New Windsor, NY (US); Kevin C. Gower, LaGrangeville, NY (US); Robert J. Reese, Austin, TX (US); Eric E. Retter, Austin, TX (US); Martin L. Schmatz, Rueschlikon (CH); Michael B. Spear, Round Rock, TX (US); Peter M. Thomsen, Hutto, TX (US); Michael R. Trombley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 12/166,139

(22) Filed: Jul. 1, 2008

(65) Prior Publication Data

US 2010/0005281 A1      Jan. 7, 2010

(51) Int. Cl.
*G11C 7/10* (2006.01)
*G11C 7/18* (2006.01)
(52) U.S. Cl. ........................... 365/201; 714/718
(58) Field of Classification Search ............ None
See application file for complete search history.

(56) References Cited

U.S. PATENT DOCUMENTS

| | | | |
|---|---|---|---|
| 4,034,195 A | 7/1977 | Bates | |
| 4,376,306 A | 3/1983 | Giusto | |
| 4,468,770 A | 8/1984 | Metcalf et al. | |
| 4,631,686 A | 12/1986 | Ikawa et al. | |
| 4,644,498 A | 2/1987 | Bedard et al. | |
| 4,775,979 A | 10/1988 | Oka | |
| 5,321,813 A | 6/1994 | McMillen et al. | |
| 5,357,621 A | 10/1994 | Cox | |
| 5,455,926 A * | 10/1995 | Keele et al. ............... | 711/4 |
| 5,513,135 A | 4/1996 | Dell et al. | |
| 5,995,405 A | 11/1999 | Trick | |
| 6,067,262 A | 5/2000 | Irrinki et al. | |
| 6,070,256 A | 5/2000 | Wu et al. | |
| 6,119,181 A | 9/2000 | Vorbach et al. | |

(Continued)

FOREIGN PATENT DOCUMENTS

EP      0883260 A2      12/1998

(Continued)

OTHER PUBLICATIONS

G. Boudon et al., "Novel Bus Reconfiguration Scheme With Spare Lines", IBM Technical Bulletin, May 1987, pp. 5590-5593.

(Continued)

*Primary Examiner* — Jeffrey A Gaffin
*Assistant Examiner* — Dipakkumar Gandhi
(74) *Attorney, Agent, or Firm* — Cantor Colburn LLP

(57) ABSTRACT

A memory buffer, memory system and method for power-on initialization and test for a cascade interconnect memory system. The memory buffer includes a bus interface to links in a high-speed channel for communicating with a memory controller via a direct connection or via a cascade interconnection through an other memory buffer. The interface is operable in a SBC mode and a high-speed mode. The memory buffer also includes a field service interface (FSI) slave for receiving FSI signals from a FSI master. In addition, the memory buffer includes logic for executing a power-on and initialization training sequence initiated by the memory controller.

19 Claims, 17 Drawing Sheets

U.S. PATENT DOCUMENTS

| | | | |
|---|---|---|---|
| 6,147,967 | A | 11/2000 | Ying et al. |
| 6,292,903 | B1 | 9/2001 | Coteus et al. |
| 6,297,995 | B1 | 10/2001 | McConnell et al. |
| 6,308,286 | B1 | 10/2001 | Richmond et al. |
| 6,337,817 | B1 | 1/2002 | Horiguchi et al. |
| 6,338,154 | B2 | 1/2002 | Kim |
| 6,367,042 | B1 | 4/2002 | Phan et al. |
| 6,381,685 | B2 | 4/2002 | Dell et al. |
| 6,518,593 | B2 | 2/2003 | Takabayashi et al. |
| 6,526,461 | B1 | 2/2003 | Cliff |
| 6,531,339 | B2 | 3/2003 | King et al. |
| 6,789,212 | B1 | 9/2004 | Klingman |
| 6,895,528 | B2 | 5/2005 | Cantwell et al. |
| 6,931,564 | B2 | 8/2005 | Goodman et al. |
| 6,973,605 | B1 | 12/2005 | Templeton et al. |
| 7,013,416 | B2 | 3/2006 | Whetsel |
| 7,058,918 | B2 | 6/2006 | Abramovici et al. |
| 7,069,494 | B2 | 6/2006 | Cargnoni et al. |
| 7,154,723 | B1 | 12/2006 | Warnakulasooriya et al. |
| 7,168,005 | B2 | 1/2007 | Adams et al. |
| 7,178,076 | B1 | 2/2007 | Zarrineh et al. |
| 7,181,659 | B2 | 2/2007 | Bravo et al. |
| 7,277,346 | B1 | 10/2007 | Rahim et al. |
| 7,299,313 | B2 | 11/2007 | Gower et al. |
| 7,334,149 | B1 | 2/2008 | Wu |
| 7,353,316 | B2 | 4/2008 | Erdmann |
| 7,362,697 | B2 | 4/2008 | Becker et al. |
| 2002/0024455 | A1 | 2/2002 | Abbiate et al. |
| 2002/0075982 | A1 | 6/2002 | Doblar |
| 2002/0144211 | A1* | 10/2002 | Maamari et al. ............. 714/811 |
| 2003/0074619 | A1 | 4/2003 | Dorsey |
| 2003/0185251 | A1 | 10/2003 | Ichino et al. |
| 2004/0180455 | A1 | 9/2004 | Marr |
| 2004/0190331 | A1 | 9/2004 | Ross et al. |
| 2004/0216026 | A1 | 10/2004 | Ferraiolo et al. |
| 2004/0250181 | A1 | 12/2004 | Vogt et al. |
| 2005/0138496 | A1 | 6/2005 | Brennan et al. |
| 2005/0174138 | A1 | 8/2005 | Marr |
| 2005/0210185 | A1 | 9/2005 | Renick |
| 2005/0223196 | A1 | 10/2005 | Knowles |
| 2005/0246597 | A1 | 11/2005 | Whetsel |
| 2006/0036827 | A1 | 2/2006 | Dell et al. |
| 2006/0048200 | A1* | 3/2006 | Jaworski et al. ............. 725/107 |
| 2006/0095620 | A1 | 5/2006 | Dreps et al. |
| 2006/0107175 | A1 | 5/2006 | Dell et al. |
| 2006/0179369 | A1 | 8/2006 | Bravo et al. |
| 2006/0179394 | A1 | 8/2006 | O'Neill et al. |
| 2006/0218455 | A1 | 9/2006 | LeClair et al. |
| 2006/0277363 | A1 | 12/2006 | Qiu et al. |
| 2007/0011562 | A1 | 1/2007 | Alexander et al. |
| 2007/0075734 | A1 | 4/2007 | Ramos et al. |
| 2007/0204190 | A1 | 8/2007 | Hesse et al. |
| 2007/0283223 | A1 | 12/2007 | Dell et al. |
| 2007/0288816 | A1 | 12/2007 | Nakanishi |
| 2007/0300129 | A1 | 12/2007 | Dell et al. |
| 2008/0005644 | A1 | 1/2008 | Dell |
| 2008/0022186 | A1 | 1/2008 | Co et al. |
| 2008/0028345 | A1 | 1/2008 | Suri et al. |
| 2008/0046774 | A1 | 2/2008 | Hirai et al. |
| 2008/0046796 | A1 | 2/2008 | Dell et al. |
| 2008/0065938 | A1 | 3/2008 | Cowell et al. |
| 2008/0115137 | A1 | 5/2008 | Gower et al. |

FOREIGN PATENT DOCUMENTS

| | | |
|---|---|---|
| EP | 1622020 A2 | 2/2006 |
| EP | 1653369 A2 | 5/2006 |
| JP | 02-307254 | 12/1990 |
| JP | 03-234125 | 10/1991 |
| JP | 09-261210 | 10/1997 |

OTHER PUBLICATIONS

Sunggu Lee, et al., "Probabilistic Diagnosis of Multiprocessor Systems", ACM Computing Surveys, Mar. 1994, pp. 121-139, vol. 26, No. 1.

Alan Charlesworth et al., "The Starfire SMP Interconnect", 1997, pp. 1-20, ACM.

Daniele Rossi et al., "New ECC for Crosstalk Impact Minimization", Jul./Aug. 2005, pp. 340-348 IEEE CS and the IEEE CASS.

Smitha Shyam et al., "Ultra Low-Cost Defect Protection for Microprocessor Pipelines", ASPLOS' 06, Oct. 21-25, 2006, pp. 73-82, ACM, San Jose, California, USA.

D.M Berger et al., "High-Speed source-synchronous interface for the IBM System z9 processor" IBM J. Res & Dev., Jan. 2007, pp. 53-64, vol. 51, No. 1/2, IBM.

FBDIMM: Architecture and Protocal, Jan. 2007, JESD206, JEDEC Solid State Technology Association, Arlington, VA USA.

International Search Report: International Application No. PCT/EP2009/057580; International Filing Date: Jun. 18, 2009; Date of mailing Oct. 1, 2009; 5 pages.

International Search Report; International Application No. PCT/EP2009/057581; International Filing Date: Jun. 18, 2009; Date of Mailing: Sep. 15, 2009.

* cited by examiner

POWER-ON INITIALIZATION AND TEST FOR A CASCADE INTERCONNECT MEMORY SYSTEM

BACKGROUND

This invention relates generally to computer memory systems, and more particularly to providing power-on initialization and testing in a memory system.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

SUMMARY

An exemplary embodiment is a memory buffer including a bus interface to links in a high-speed channel for communicating with a memory controller via a direct connection or via a cascade interconnection through an other memory buffer. The interface is operable in a static bit communication (SBC) mode and a high-speed mode. The memory buffer also includes a field service interface (FSI) slave for receiving FSI signals from a FSI master. In addition, the memory buffer includes logic for executing a power-on and initialization training sequence initiated by the memory controller. The sequence includes initializing the links to the high-speed channel, a power-on reset that relies on stand-by voltage rails and is controlled by the signals received by the FSI slave, and handshaking to the other memory buffer or to the memory controller, all or a portion of the handshaking is performed in the SBC mode.

Another exemplary embodiment includes a high reliability cascade interconnect memory system. The memory system includes a memory controller that includes logic for initiating a power-on and initialization training sequence for the memory system. The sequence includes a plurality of training states and utilizing a SBC protocol for at least a portion of controlling the training states and handshaking between the memory controller and one or more memory buffers in the cascade interconnect memory system. The memory system also includes a high-speed channel in communication with the memory controller, the high-speed channel including a plurality of links that are initialized by a plurality of training states. In addition, the memory system includes a memory buffer in communication with a plurality of memory devices and in communication with the high speed channel for communicating with the memory controller via direct connection or via a cascade interconnection through an other hub device. The memory buffer includes a FSI slave for receiving FSI signals from a FSI master and logic for executing all or a portion of the power-on and initialization sequence. The sequence includes a power-on reset that relies on stand-by voltage rails and is controlled by the signals received by the FSI slave.

A further exemplary embodiment is a method for executing power-on initialization and test at a memory buffer. The method includes receiving a power-on and initialization sequence at a memory buffer. The sequence is received from a memory controller. The memory controller and the memory buffer are in a cascade interconnect memory system. The memory buffer includes a bus interface operable in a SBC or high-speed mode to links in a high-speed channel for communicating with the memory controller via a direct connection or via a cascade interconnection through an other memory buffer in the memory system. The sequence is executed at the memory buffer, executing includes initializing the links to the high speed channel and performing a power on-reset that relies on stand-by voltage rails and is controlled by signals received by a FSI slave. Handshaking is performed to the other memory buffers or to the memory controller, and all or a portion of the handshaking is performed in the SBC mode.

A still further exemplary embodiment is a design structure tangibly embodied in a machine-readable medium for designing, manufacturing, or testing an integrated circuit. The design structure includes a memory buffer that includes a bus interface to links in a high-speed channel for communicating with a memory controller via a direct connection or via a cascade interconnection through an other memory buffer. The interface is operable in a SBC mode and a high-speed mode. The memory buffer also includes a field service interface (FSI) slave for receiving FSI signals from a FSI master. In addition, the memory buffer includes logic for executing a power-on and initialization training sequence initiated by the memory controller. The sequence includes initializing the links to the high-speed channel, a power-on reset that relies on stand-by voltage rails and is controlled by the signals received by the FSI slave, and handshaking to the other memory buffer or to the memory controller, all or a portion of the handshaking is performed in the SBC mode.

An additional exemplary embodiment is a design structure tangibly embodied in a machine-readable medium for designing, manufacturing, or testing an integrated circuit.

Other systems, methods, apparatuses, design structures and/or computer program products according to embodiments will be or become apparent to one with skill in the art upon review of the following drawings and detailed description. It is intended that all such additional systems, methods, apparatuses, design structures and/or computer program products be included within this description, be within the scope of the present invention, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION

An exemplary embodiment of the present invention relates to power-on initialization and training sequences, including tests and repairs in enhanced cascade interconnect memory systems. An exemplary embodiment provides improvements in the overall training sequencing making use of a static bit communication (SBC) mode. An exemplary embodiment includes a power-on reset mode using a service interface and standby voltage 622 rails, a de-skewing method for a multi-channel lock-step configuration and a repeated initial program load (IPL) modes. In addition, several improved procedures are used in the initialization of the SDRAM subsystem (e.g., a method for read data strobe centering).

An enhanced cascaded interconnect memory system supports per lane data rates in the several gigabit per second range and has additional features that need be addressed during start-up/training that are described herein. In addition, an exemplary embodiment uses an SBC mode in the training phase that allows more flexibility and improved control data exchange during start-up. The training sequence described herein is able to test high-speed clock and data lanes, and switch bus segments to spare clocks and lanes. It includes multi-channel de-skewing and may be entered at different states for repeated IPL (Initial Program Load) in the field.

Figure 1:
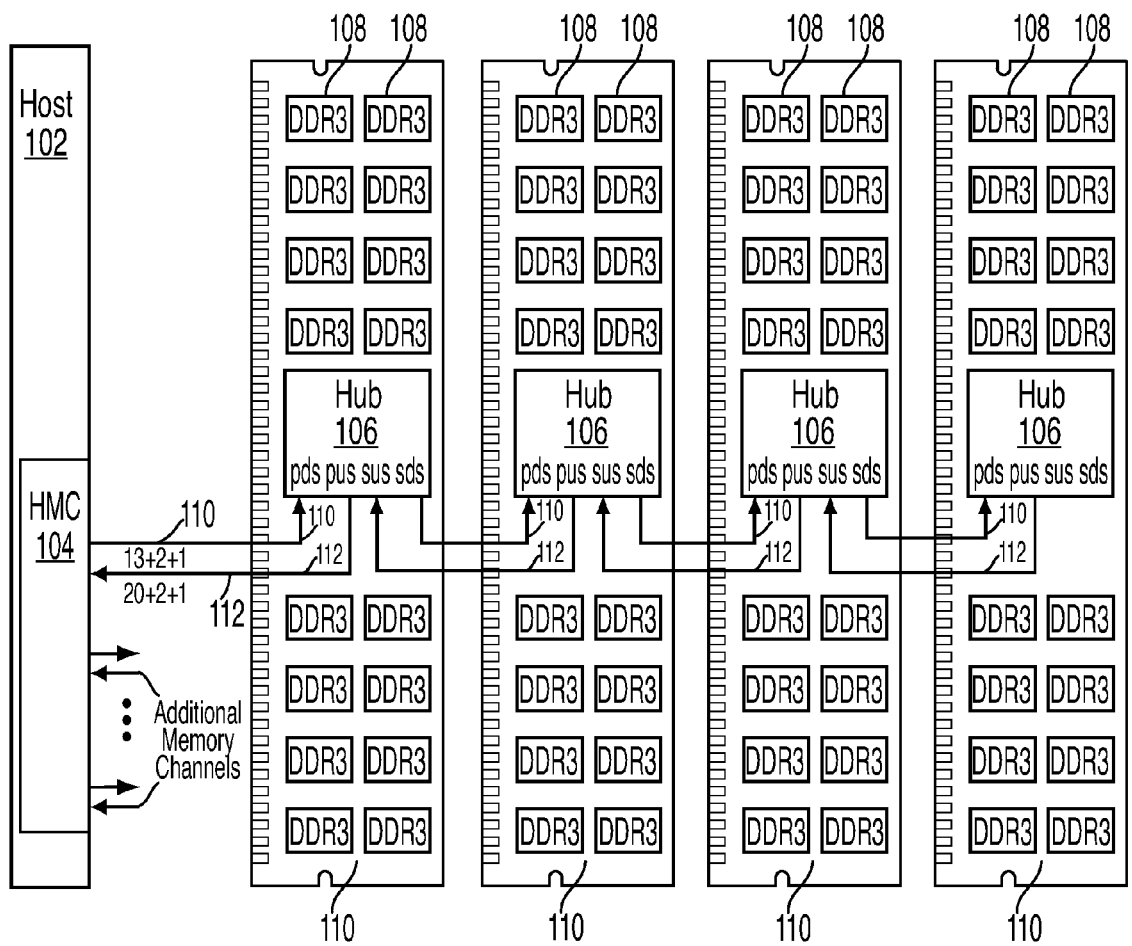
FIG. 1 depicts an exemplary enhanced cascaded interconnect memory system to which an exemplary embodiment of the present invention to provide a power-on and training sequence may be applicable.

FIG. 1 depicts an exemplary enhanced cascaded interconnect memory system 100 which may be utilized by an exemplary embodiment of the present invention to provide a power-on and training sequence. A typical configuration of such a buffered memory channel includes a host processor 102 with a memory controller (MC) 104 and a number of cascade interconnected memory modules 110. The memory modules 110 are cascaded and interconnected through a high speed data channel made up of downstream buses 110 and upstream buses 112. On each memory module 110 there is a memory buffer (MB) 106 that, in an exemplary embodiment, receives and drives 13 data lanes, 2 spare lanes and a clock in a downstream direction. In addition, the MB 106 receives and drives 20 data lanes, 2 spare lanes and a clock in an upstream direction. All of these lanes operate in the several gigabytes per second per lane range. Input/outputs (I/Os) on the host side are indicated as primary (e.g., PUS for primary upstream transmitter) and I/Os on the cascade side are indicated as secondary (e.g., SUS for secondary upstream receiver). See FIG. 11 herein below which depicts an exemplary transmitter/receiver configuration that may be implemented by an exemplary embodiment. See also FIG. 13 herein below which depicts a memory system that may be implemented by an exemplary embodiment.

Figure 2:
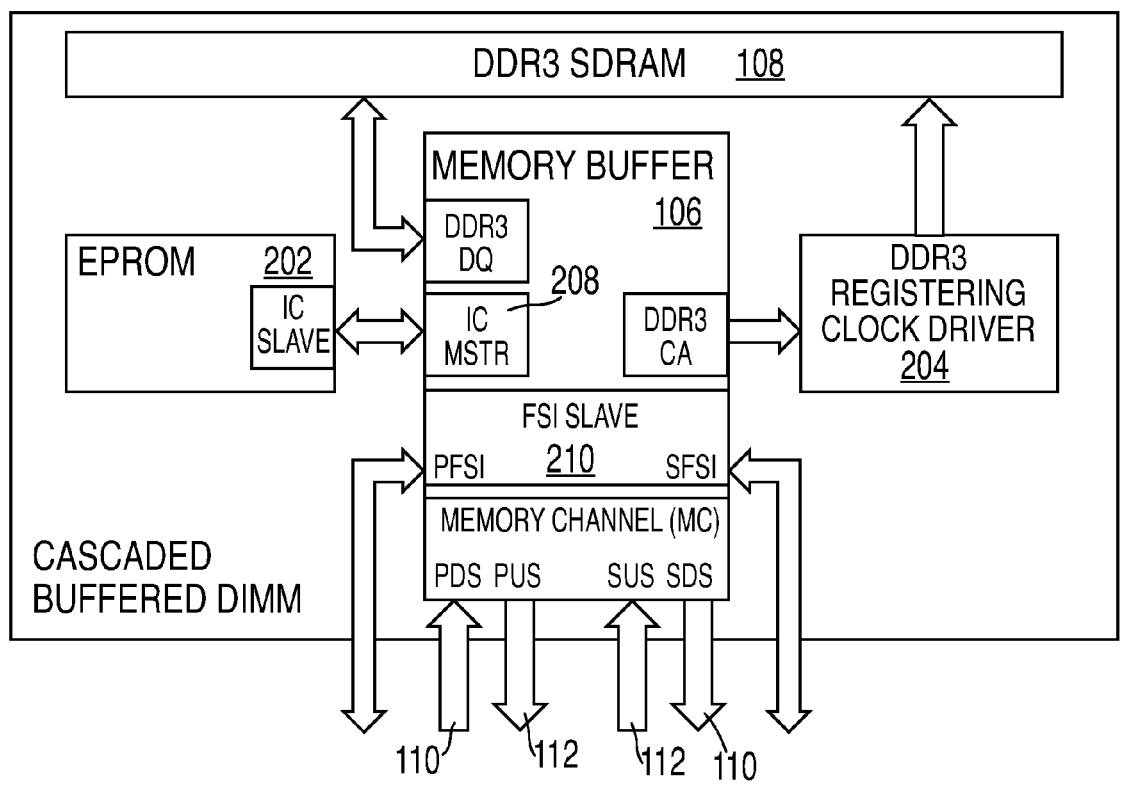
FIG. 2 depicts additional hardware utilized by memory modules in an exemplary embodiment for power-on and initialization.

FIG. 2 depicts additional hardware utilized by memory modules in an exemplary embodiment for power-on and initialization. The memory module 200 depicted in FIG. 2 includes an EPROM 202 with an I2C slave which is in communication with an I2C master 208 on the MB 106. In an exemplary embodiment the EPROM 202 contains vital product data. The memory module 200 also includes a DDR3 registering clock driver (RCD) 204 for driving command and address bus to the memory device 108. As depicted in FIG. 2, the MB 106 supports interface to the memory devices 108, to the RCD 204, to the EPROM 202 and to the high-speed upstream bus 112 and high-speed downstream bus 110. In addition, the MB 106 is equipped with a field service interface (FSI) slave which is controlled by an external FSI master. In addition, FSI I/Os may also be cascaded through the MB 106 cascade interconnection. The FSI is used to access control registers in the MB 106 and to access memory in the EPROM 202. The MB 106 and EPROM 202 are both equipped with standby voltage rails (VDDstby). See FIG. 16 below for an exemplary hub device (also referred to herein as a memory buffer) that may be utilized by an exemplary embodiment of the present invention.

Figure 3:
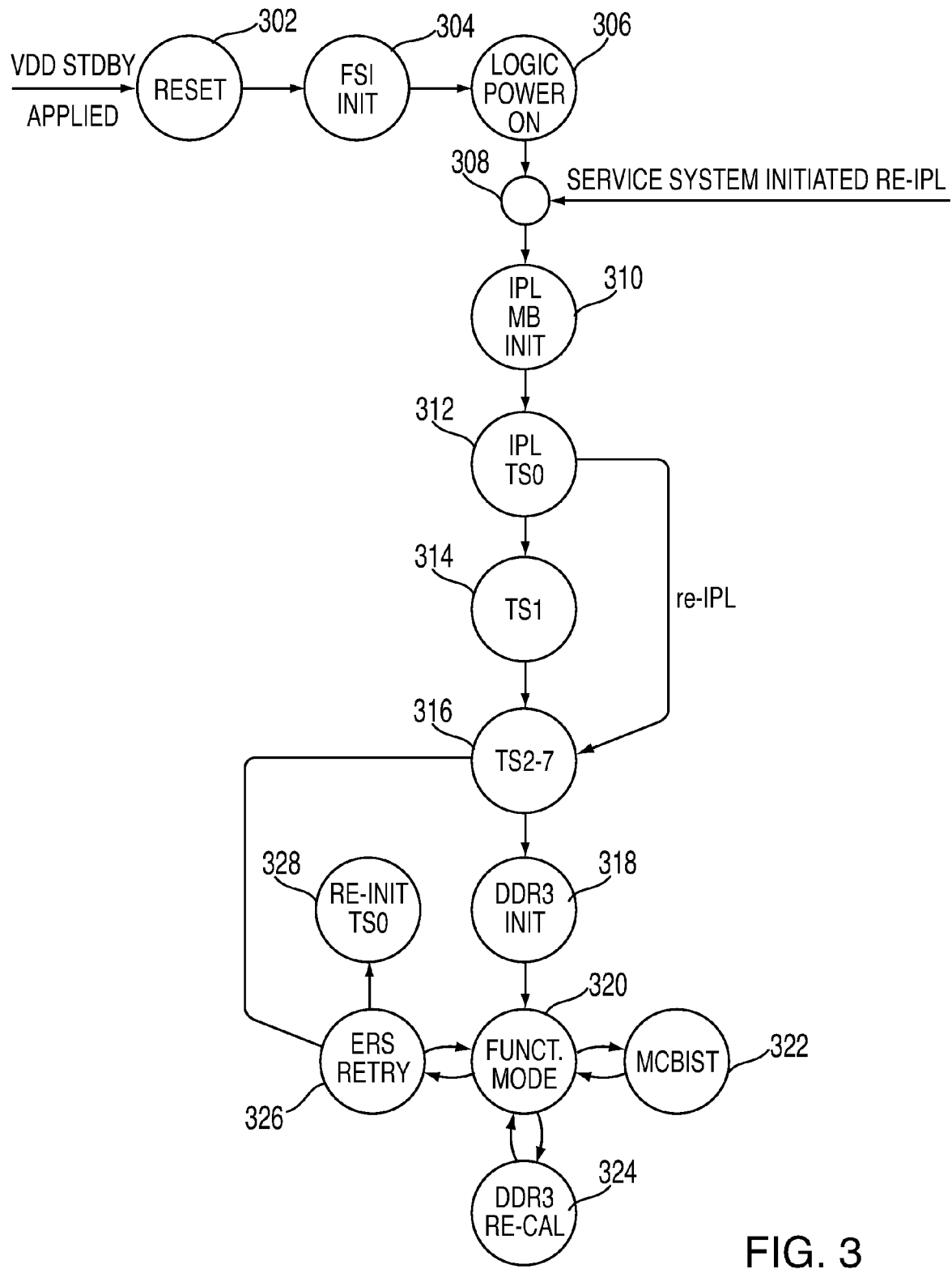
FIG. 3 depicts a simplified state diagram including the high-level transitions between states of a hub device during power-up and initialization in an exemplary embodiment.

FIG. 3 depicts a simplified state diagram including the high-level transitions between states of the MB during power-up and initialization in an exemplary embodiment. In an exemplary embodiment, the power-on reset sequence starts when power is applied to the system standby voltages (VDDstby) while a global RESET signal is driven to its active state at state 302. Control registers of the MB are scan flush reset to their initial value. RESET is deactivated after VDDstby is stable for a selected amount of time (e.g., 100 milliseconds, 50 milliseconds, 300 milliseconds). Next, the MB is in the FSI initialization state 304 where the FSI clocks are started and propagated through the cascade of MBs. FSI commands are used to identify MB chips and sense their topology. FSI commands are used to read vital product data from the EPROM and chip ID as well as engineering change level of the MB chip. At state 306, logic power is applied first to the MB core logic, followed by the memory devices.

If a re-IPL is initiated by a service system, then the MB starts at state 310. At state 310, the IPL MB initialization state, a test and pervasive initialization sequence is performed. This includes pre-clocking analog I/O tests and calibration and initialization of MB control registers, clock control and training state control register initialization. At state 312, the high-speed memory channel clocks are started and the system proceeds to training state zero (TS0) (clock detection and repair) as described below in reference to FIGS. 4 and 5. Optionally, logic built-in self-test (LBIST) is performed here, followed by repeated states 310 and 312.

Next, training state one (TS1) is performed at state 314. This includes starting the MB core logic clocks, configuring the MB control and mode registers, and performing DC calibration of the high-speed memory channel. In an exemplary embodiment, this state is skipped during re-initialization and repair operation. Next, as shown in state 316, the system proceeds with training state two (TS2) through training state six (TS6) as described below in reference to FIGS. 6-16. Training state seven (TS7), read data latency calculation and inter-channel de-skew is also performed. At state 318 the DDR3 interface is initialized; this includes memory delay line calibration, RCD power-up and initialization, SDRAM initialization, read data gate delay optimization and read data strobe centering as well as write leveling. At state 320, the memory system is in functional mode. At this time, any one of state 328 re-initialize TS0, state 326 error recovery retry, state 324 memory device recalibration, or state 322 MCBIST (Memory Card Built In Self Test) may be entered into depending on events in the memory system.

During memory channel initialization, link training states perform run time calibration and lane segment repair of the cascaded memory channel. Link training states are normally navigated by hardware control to enable dynamic channel repair and re-initialization. An exemplary embodiment of the initialization sequence allows controlling the training states also by the FSI (selectable) to assist test and bring-up.

In an exemplary embodiment the training states accomplish the following: TS0—clock detection, test and repair; TS1—static configuration and calibration; TS2—downstream lane training and repair; TS3—upstream lane training and repair; TS4 packet training; TS5—initiate valid packets; TS6—frame lock; and TS7—read data latency calculation and inter-channel de-skew. The following is a description of exemplary procedures within each training state. Static bit communication (SBC) is used for the handshaking between the MBs in the cascade and for repair vector exchange. SBC is described herein below in reference to FIGS. 11-16.

TS0—clock detection and repair. TS0 is used to perform upstream (US) and downstream (DS) clock detection and repair (if necessary). System control firmware (FW) places the memory controller into the TS0*b* state. At the end of a TS0 sequence that is initiated by FW, control is returned to FW. During run-time, the clock detection circuits used during TS0 are re-used to monitor the health of the returned US clock from the cascaded memory channel. If the clock detector diagnoses a failing clock, the hardware will enter TS0 autonomously and begin the re-initialization and repair procedure. Entering TS0 using SBC during run-time will result in a downstream CRC error. This will cause the MB chip to enter the error recovery state (ERS). During a hardware initiated re-initialization procedure, the host immediately proceeds to TS2 when TS0 is complete.

SBC commands are used in an exemplary embodiment of TS0 as described in the following table:

TABLE 1

Static Bit Communication commands used during TS0

| Name | Description |
| --- | --- |
| TS0_pdsck | This command causes the downstream receiver logic to enter the TS0 state, reset its memory channel PLLs and select the PDSCK clock as the MB reference clock. This SBC is not forwarded. |
| TS0_pdss0 | This command signals the downstream receiver to reset its memory channel PLLs and select the spare clock, PDSS0 as the MB reference clock. This SBC is not forwarded. |
| TS0_pusck | This command signals the MB PUS Tx logic to select the PUSCK as the returned bus clock and to deactivate the PUSS0 spare clock. |
| TS0_puss0 | This command signals the MB PUS Tx logic to select the PUSS0 as the returned bus clock and to deactivate the PUSCK clock. |
| TS_done | This response indicates the local and all cascaded MBs are done with TS0. |

The TS0 states in an exemplary embodiment are described in the following table:

TABLE 2

Clock Detection and Repair Training States (TS0)

| Name | Description |
| --- | --- |
| TS0a - Wrap Selected Clock | Cascaded MB locks its Tx PLLs using the selected PDS clock. This takes 1000's of HMC clock cycles. Next it drives the upstream clock on both its PUSCK and PUSS0 lanes. This state is exited when the US clock select SBC is received. |
| TS0b - Test and Select Wrapped Clock | Host/MB drives downstream bus clock on SDSCK lane and issues TS0_pdsck SBC. After lock timer, host/MB uses clock detection logic to test clock returned from cascade. The additional TS0 SBCs are used to select functional US and DS clocks with priority given to the non-spares. If neither DS clock selection returns a functional clock on either of the US lanes, the MB assumes it is last and proceeds to TS0d. If a returned US clock is detected, the MB proceeds to TS0c when it issues the US clock select SBC. |
| TS0c - Wait For Done | In this training state the host/MB simply waits for the TS_done response from its cascaded MB. |
| TS0d - Issue Done | During this TS the MB issues the TS_done SBC on its US link. |

Figure 4:
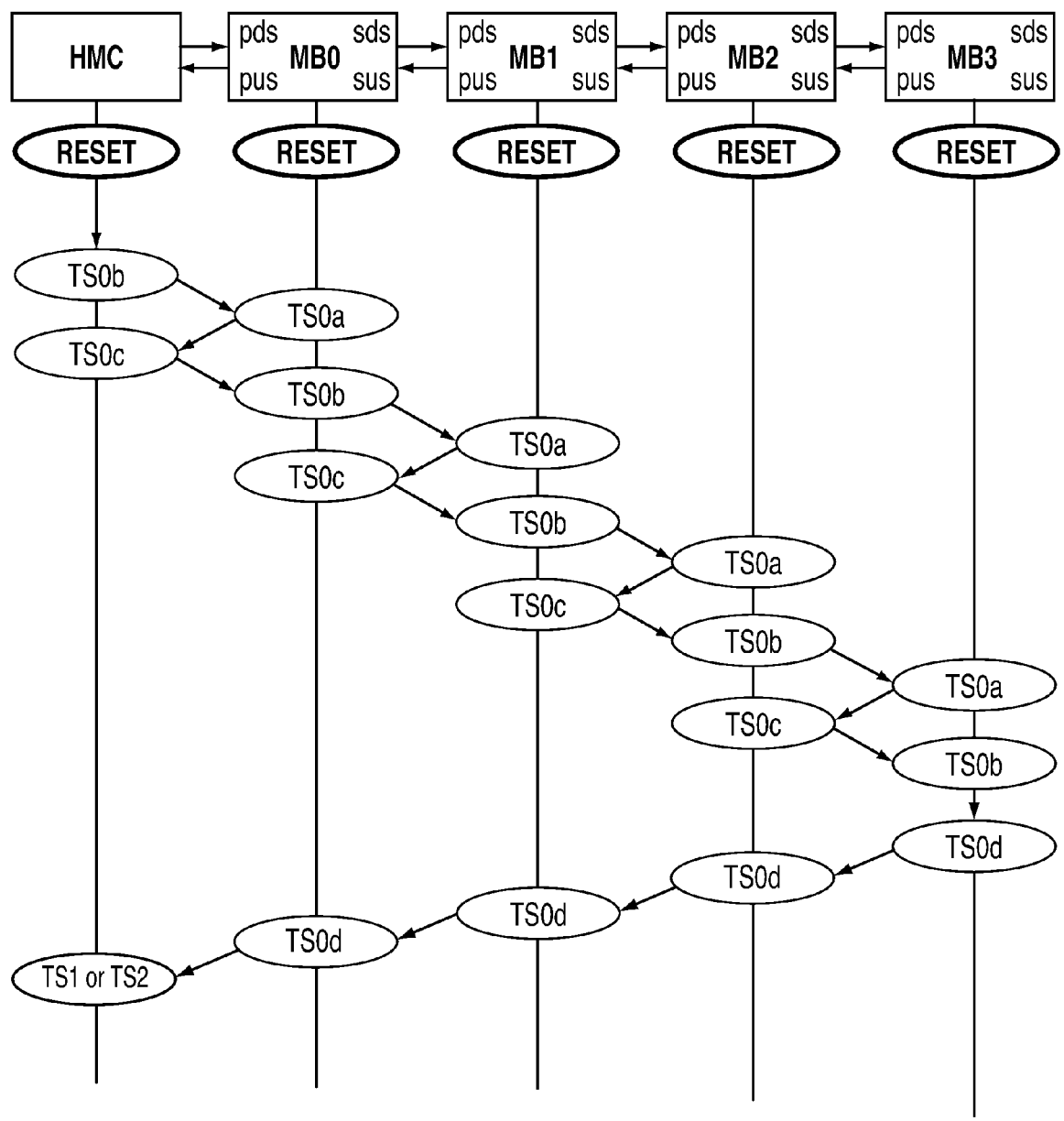
FIG. 4 depicts a process flow that may be implemented by training state TS0 in an exemplary embodiment.

FIG. 4 depicts a process flow that may be implemented by TS0 in an exemplary embodiment. The cascade interconnect memory system depicted in FIG. 4 includes a host memory controller (HMC) and four memory buffers (MB0, MB1, MB2, MB3). The number of MBs will vary depending on the implementation. As depicted in FIG. 4, the HMC and the MBs are all reset, then the HMC initiates a TS0*b* state which drives a TS0*a* state to MB0. When MB0 has completed the TS0*a* state processing it returns a handshake (e.g., via SBC) to the HMC to let it know that TS0*a* has been completed and the status (e.g., successful). Then the HMC initiates a TS0*c* state which drives a TS0*b* state to MB0, in turn MB0 drives a TS0*a* state to MB1. TS0 processing continues as depicted in FIG. 4 until the TS0*b* state has been completed on MB3 and there is no downstream MB for the TS0*b* to initiate a TS0*a* on. When this occurs, the TS0*d* state is initiated on MB3 and then a handshake occurs between each MB back to the HMC. The HMC then enters TS1 or TS2.

TS1: static configuration and calibration. TS1 is fully firmware controlled and in an exemplary embodiment, is skipped during a hardware initiated re-initialization and repair. During this step, the MB device is configured through the FSI and the memory channel circuits perform static calibration. MB information such as the electronic chip identification or Engineering Change ID may be polled during this sequence. After the MB configuration registers have been loaded, DC calibration of the memory channel is performed. This is accomplished by executing maintenance commands on the FSI service interface.

TS2: downstream lane training and repair. TS2 is used in an exemplary embodiment to perform downstream data lane training, test, and repair (if necessary). It is initiated by firmware during the power-on reset initialization sequence. It may also be entered by a hardware initiated re-initialization and repair sequence (see below). In the latter case it would immediately follow TS0 with the host responsible for sending the TS2a announcement SBC. In either case the host immediately proceeds to TS3 when TS2 is complete. SBC commands are used during TS2 as described in the following table:

TABLE 3

Static Bit Communication commands used during TS2

| Name | Description |
| --- | --- |
| TS2_annc | This command announces the beginning of TS2a. This SBC is corrected and forwarded by MBs in the memory channel. |
| TS2_ack | This response indicates that all downstream MBs have returned the TS2a_ack SBC. The last MB issues this response upon detecting the TS2a_annc. |
| TS_[clk,data] | Clock and data SBC is used to send the 32 bit lane repair vector to the MB/host immediately upstream in the memory channel. |
| TS_done | This response indicates the local and all cascaded MBs are done with TS2. |

Note:
an all '0's pattern scrambled by a PRBS23 is driven by DS Tx's during periods when SBC is not being employed.

In the TS2 training state the MBs analyze a PRBS23 signal to detect broken lanes and to switch faulty lane segments between two MBs to spare lanes. The information on the required lane switching is returned to the upstream MB via an SBC 32 bit lane repair vector. The TS2 states are described in the following table:

TABLE 4

DS High Speed Lane Training, Test and Repair Training States (TS2)

| Name | Description |
| --- | --- |
| TS2a - announce | Host drives TS2a_annc SBC and waits for acknowledgment. MBs decode, correct and forward TS2a_annc SBC. |
| TS2b - acknowledge | The last MB in the memory channel immediately sends TS2a_ack upon detecting TS2a_annc. TS2a_ack is decoded, corrected and forwarded back to the host by the remaining MBs. |
| TS2c - train and test | Upon detection of acknowledgement the host begins sending a PRBS23 pattern. Upon removal of TS2_annc, MBs drive locally generated PRBS23 on downstream transmitters. Also, MB PDS receivers analyze received signal quality, identify broken |

TABLE 4-continued

DS High Speed Lane Training, Test and Repair Training States (TS2)

| Name | Description |
| --- | --- |
|  | lanes, achieve bit lock, equalize receivers and perform BER optimization. |
| TS2d - repair | If necessary, MBs issue a 32 bit lane repair vector to its immediate upstream master using TS_[clk,data] protocol. PRBS23 continues on DS Tx's. |
| TS2e - wait for done | In this training state the host/MB simply drive the PRBS23 pattern while waiting for the TS_done response from its cascaded MB. |
| TS2f - Issue Done | During this TS the MB issues the TS_done SBC on its US link. As the cascaded MBs and host receive the done indicator they cease driving the PRBS23 pattern on their DS Tx's and load the appropriate bit lane repair vectors into their DS transmitters and US receivers. |

Figure 5:
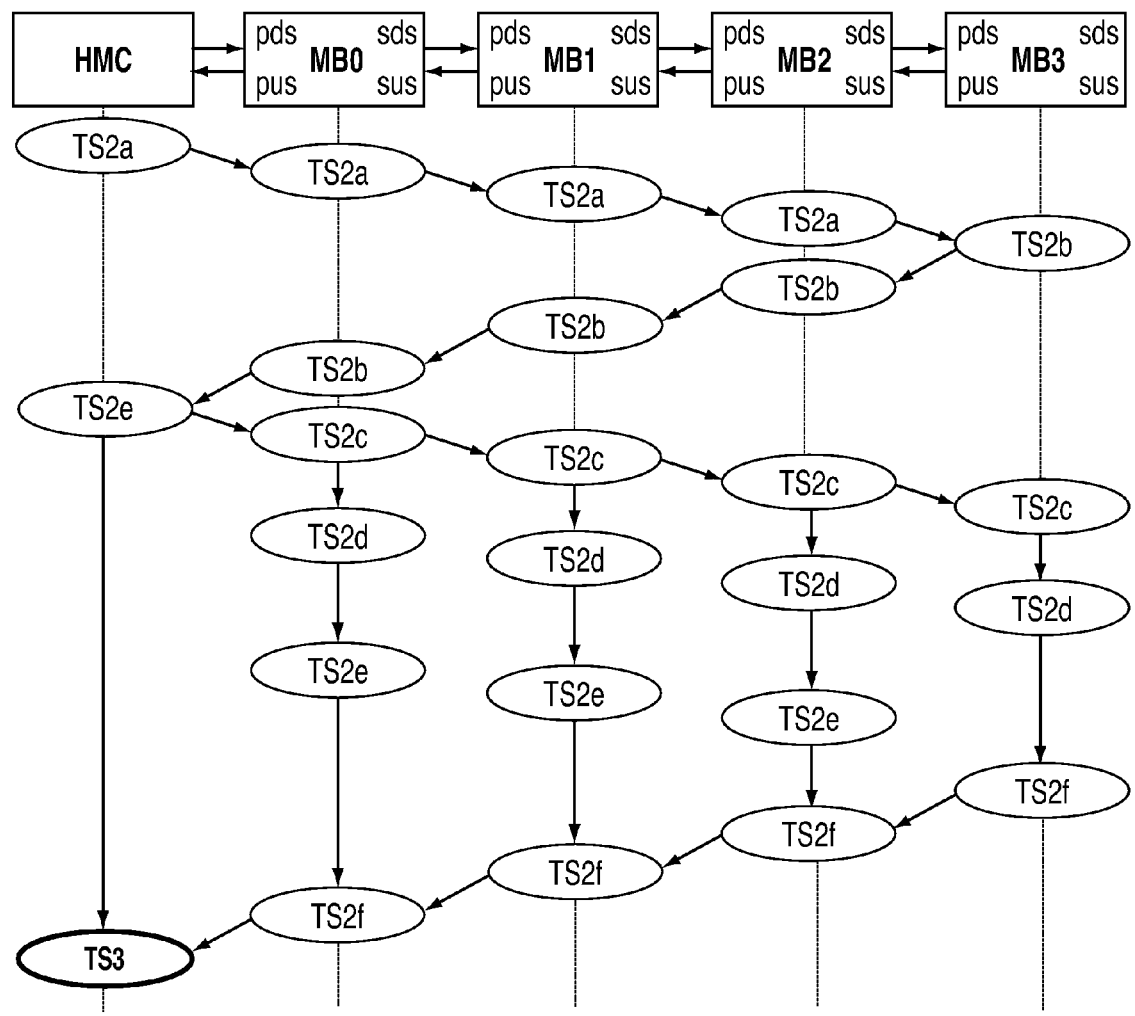
FIG. 5 depicts a process flow that may be implemented by training state TS2 in an exemplary embodiment.

FIG. 5 depicts a process flow that may be implemented by TS2 in an exemplary embodiment.

TS3: upstream lane training and repair. TS3 is used to perform upstream data lane training, test and repair (if necessary). It immediately follows TS2 with the host responsible for sending the TS3a announcement SBC. The host immediately proceeds to TS4 when TS3 is complete. SBC commands used during TS3 are described in the following table:

TABLE 5

Static Bit Communication commands used during TS3

| Name | Description |
| --- | --- |
| TS3_annc | This command announces the beginning of TS3a. This SBC is corrected and forwarded by MBs in the memory channel. |
| TS3_ack | This response indicates that all downstream MBs have returned the TS3a_ack SBC, The last MB issues this response upon detecting the TS3a_annc. |
| TS_[clk,data] | Clock and data SBC is used to send the 32 bit lane repair vector to the MB/host immediately downstream in the memory channel. |
| TS_done | This response indicates the local and all cascaded MBs are done with TS2. |

Note:
an all '0's pattern scrambled by a PRBS23 is driven by US Tx's during periods when SBC is not being employed.

The TS3 states are described in the following table:

TABLE 6

US Lane Training and Repair Training States (TS3)

| Name | Description |
| --- | --- |
| TS3a - announce | Host drives TS3a_annc SBC and waits for acknowledgment. MBs decode, correct and forward TS3a_annc SBC. |
| TS3b - acknowledge | The last MB in the memory channel immediately sends TS3a_ack upon detecting TS3a_annc. TS3a_ack is decoded, corrected and forwarded back to the host by the remaining MBs. |
| TS3c - train and test | Upon removal of TS3a_annc, MBs drive locally generated PRBS23 on upstream transmitters. The host and MB US receivers analyze received signal quality, identify broken lanes, achieve bit lock, equalize receivers and perform BER optimization. |

TABLE 6-continued

US Lane Training and Repair Training States (TS3)

| Name | Description |
| --- | --- |
| TS3d - repair | If necessary, the host and/or MBs issue a 32 bit lane repair vector to its immediate downstream slave using TS_[clk,data] protocol. |
| TS3e - wait for done | In this training state the host/MB issues TS_done on its Ds Tx's and waits for the TS_done response on its US Rx's. |
| TS3f - Issue Done | The last MB ceases driving PRBS23 and replies with TS_done on its US Tx's as soon as it detects the DS Rx's TS_done. The other MBs decode, cease PRBS23, correct and forward the TS_done. |

Figure 6:
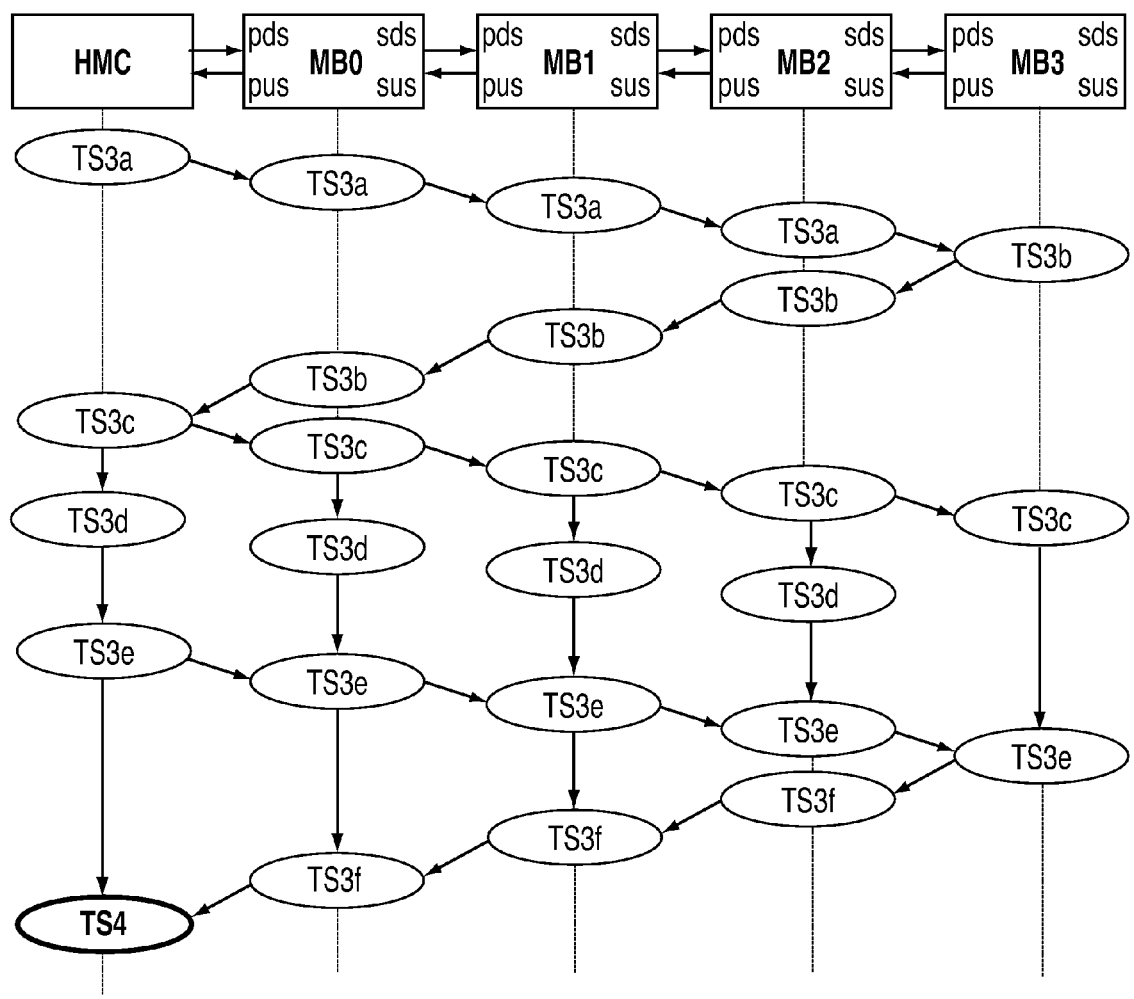
FIG. 6 depicts a process flow that may be implemented by training state TS3 in an exemplary embodiment.

FIG. 6 depicts a process flow that may be implemented by TS3 in an exemplary embodiment.

TS4: packet training (de-skew). TS4 is used to perform packet training (also known as de-skew). It immediately follows TS3 with the host responsible for sending the TS4 announcement SBC. The host immediately proceeds to TS5 when TS4 is complete. SBC commands used during TS4 are described in the following table:

TABLE 7

Static Bit Communication commands used during TS4

| Name | Description |
| --- | --- |
| TS4_annc | This command announces the beginning of TS4a. This SBC is corrected and forwarded by MBs in the memory channel. |
| TS4_ack | This response indicates that all downstream MBs have returned the TS4_ack SBC. The last MB issues this response upon detecting the TS4 announcement. |

The TS4 states are described in the following table:

TABLE 8

Packet Training States (TS4)

| Name | Description |
| --- | --- |
| TS4a - announce | Host drives TS4_annc SBC and waits for acknowledgment. MBs decode, correct and forward TS4_annc SBC and wait for ack |
| TS4b - acknowledge | The last MB in the memory channel immediately sends TS4_ack upon detecting TS4_annc. TS4_ack is decoded, corrected and forwarded back to the host by the remaining MBs. |
| TS4c - drive DS Tx | Upon receiving the TS4_ack, the host begins driving a scrambled, all 0 pattern on each of the DS Tx lanes. MBs in the memory channel will also drive scrambled, all 0 patterns on their DS Tx's once they have exited TS4d. |
| TS4d - train DS Rx | Upon removal of the TS4_annc SBC, MBs in the memory channel will re-establish bit-lock, seed their descrambler state machines for their DS Rx's and align their FIFOs. |
| TS4e - drive US Tx | Upon completing TS4d, the last MB begins driving a scrambled, all 0 pattern on each of the US Tx lanes. The other MBs in the memory channel will also drive scrambled, all 0 patterns on their US Tx's once they have exited TS4f. |
| TS4f - train US Rx | Upon removal of TS4_ack SBC, MBs and the host will re-establish bit-lock, seed their descrambler state machines for their US Rx's and align their FIFOs. |

Figure 7:
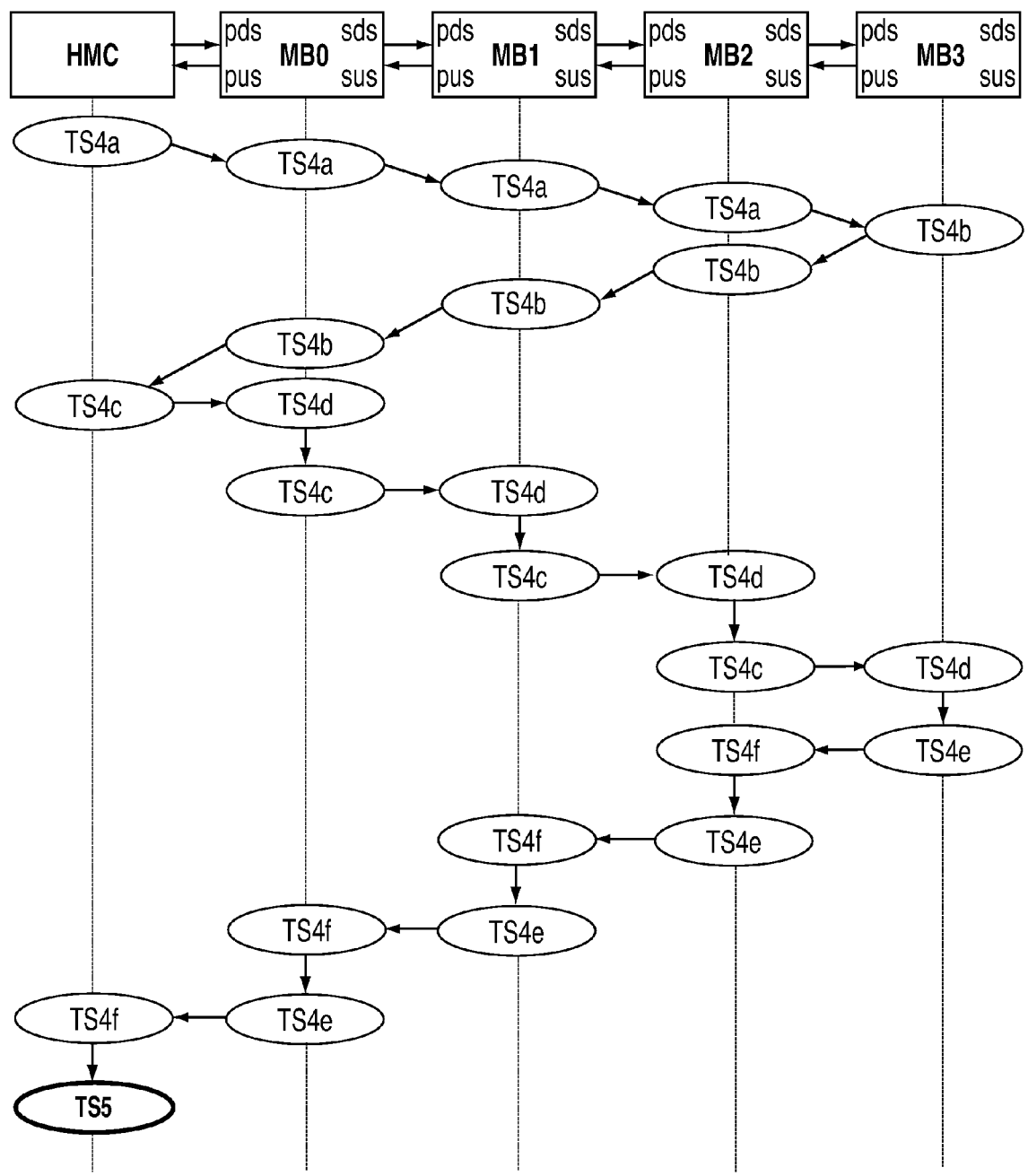
FIG. 7 depicts a process flow that may be implemented by training state TS4 in an exemplary embodiment.
Figure 8:
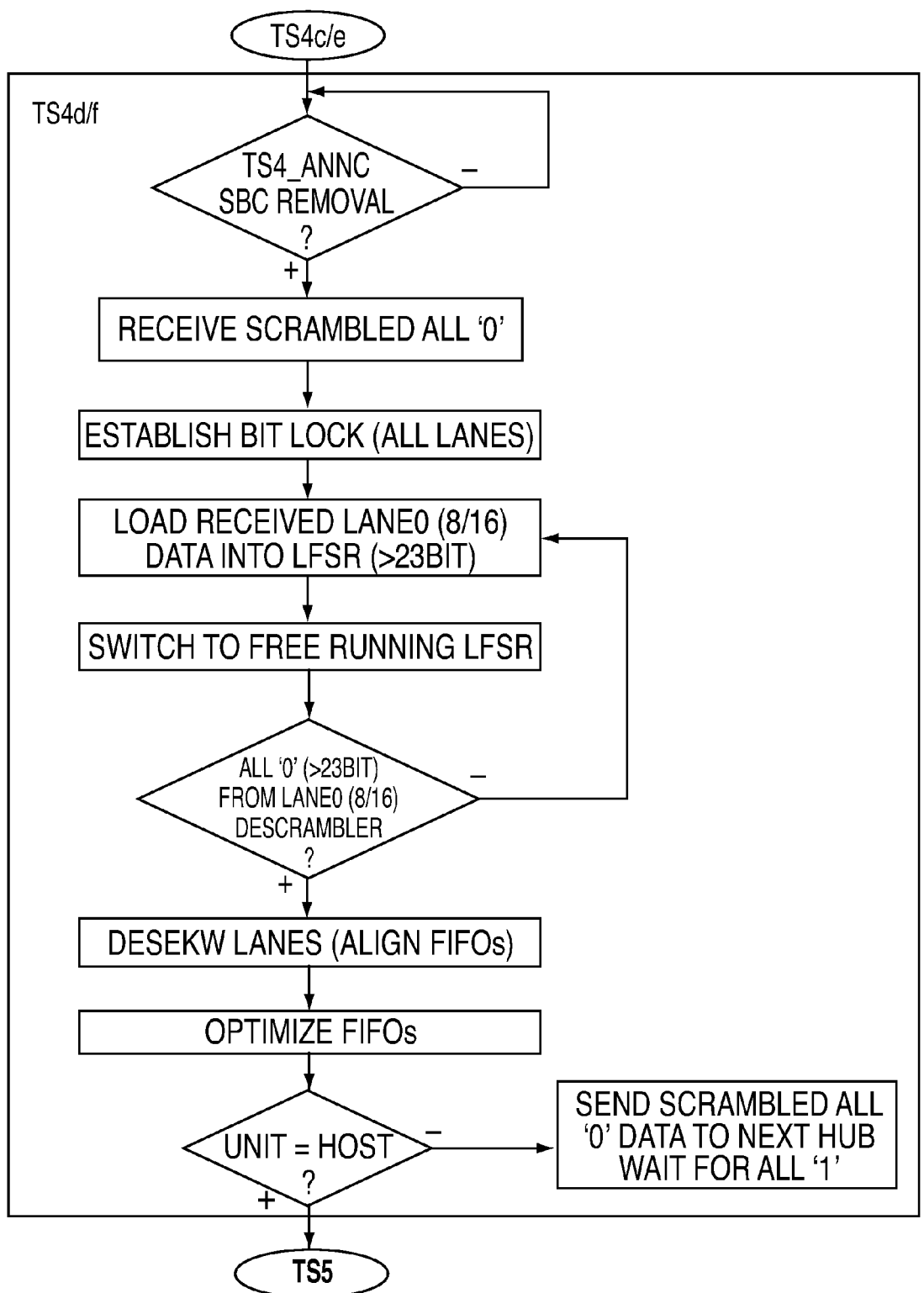
FIG. 8 depicts a process flow that may be implemented by training states TS4d and TS4f in an exemplary embodiment.

FIG. 7 depicts a process flow that may be implemented by TS4 in an exemplary embodiment. FIG. 8 depicts a more detailed view of the processing that is performed by states TS4d and TS4f in an exemplary embodiment.

TS5: initiate valid packets (block lock). TS5 initiates valid, non-zero packets to align the data phase in the receivers and achieve 4 transfer block lock. When complete, transfer 0 of each block will be received and de-serialized onto the correct internal signal. TS5 immediately follows TS4 which ends with the host and all MBs driving scrambled zeros. When the host Rx packet training is complete (TS4f), it sends four transfers of all '1's on its DS Tx's to begin TS5. The first MB achieves block lock with this packet before sending the all '1's block on its DS Tx's. The host immediately proceeds to TS6 when TS5 is complete. SBCs are not used during this training state to retain bit lock.

The TS5 states for an exemplary embodiment are described in the following table:

TABLE 9

Valid Packet Training States (TS5)

| Name | Description |
| --- | --- |
| TS4e | MBs in TS4e are searching for a non-zero block to lock onto. |
| TS5a - drive DS | During this state the host and MBs drive all '1's for 4 transfers, then the host begins sending 0's and MB's begin forwarding PDS data to the SDS Tx's. They also wait for the '1's block to be returned on the US link. When US '1's are detected the host and MBs will lock onto it, align data phase and achieve US block lock. |
| TS5b - drive US | The last MB in the memory channel immediately sends all '1's for 4 transfers on its PUS Tx's upon achieving PDS block lock. Thereafter it sends the scrambled US Idle packet. Other MBs in the channel drive all '1's for 4 transfers once their SUS Rx's have achieved block lock. |

Figure 9:
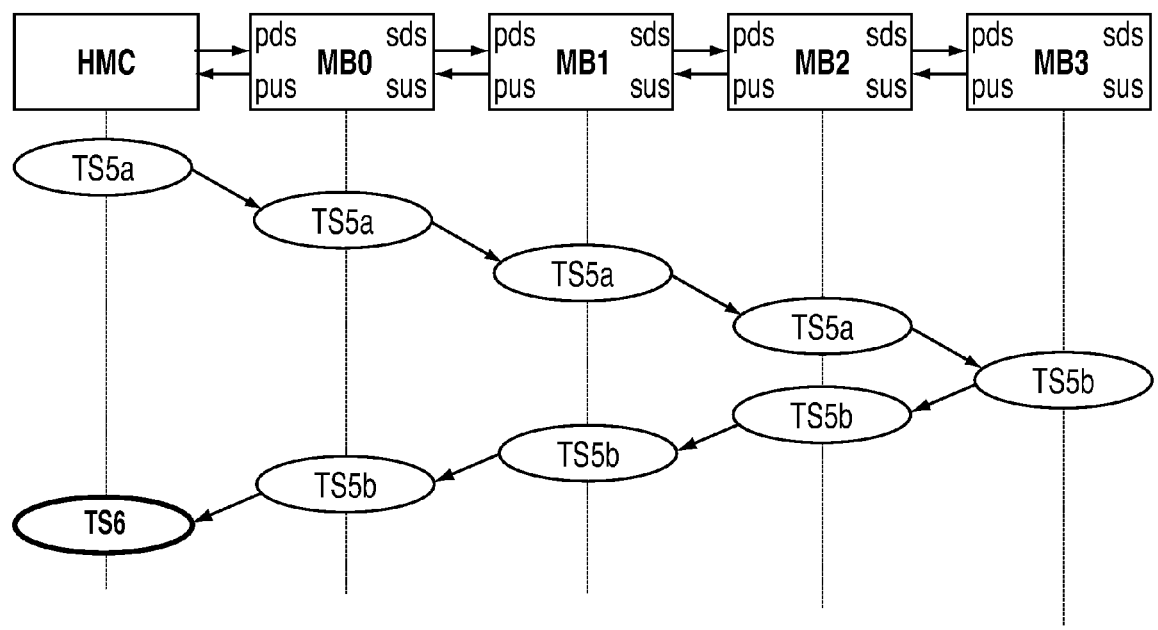
FIG. 9 depicts a process flow that may be implemented by training state TS5 in an exemplary embodiment.

FIG. 9 depicts a process flow that may be implemented by TS5 in an exemplary embodiment.

TS6: frame lock (DRAM clock synchronization). TS6 initiates valid DS frames to synchronize the MB SDRAM clock to incoming DS frames using "clock ratio modulus" engines, depending on the programmed ratio between the high-speed (HMC) and SDRAM clock frequencies. After synchronization has been achieved, the MB will be ready to decode normal DS commands. TS6 immediately follows TS5 which ends with the host driving scrambled zeros, the last MB driving US idles and other MBs forwarding received signals onto their respective transmitters. When the host US Rx achieves block lock at the end of TS5, it sends an entire frame of all '1's on its DS Tx's to begin TS6. In the 5:1 clock ratio case, the host sends the first 8 transfer frame of all '1's. MBs in the memory channel cascade the frame while using it to adjust the phase of its memory clock divider and "ratio modulus engine." SBCs are not used during this training state to retain bit lock on the high-speed memory channel.

TS6 states as implemented by an exemplary embodiment are described in the following table:

TABLE 10

Frame Lock Training State (TS6)

| Name | Description |
| --- | --- |
| TS5b | MBs in TS5b are searching for a non-zero frame to lock onto. |
| TS6a - drive DS | During this state the host drives all '1's for 8, 8, 12 or 16 transfers as appropriate for the 4:1, 5:1, 6:1 and 8:1 HMC to SDRAM clock ratios respectively. The host should wait long enough for each cascaded MB to achieve PLL lock and then the memory channel will be ready for normal DS commands. |
| TS6b - frame lock | Each MB in the memory channel uses the all '1's frame to phase-adjust its memory clock divider and synchronize with the 'SDRAM ratio modulus' engine. Once complete the PLLs will re-lock and then the MBs are ready for normal DS frames and commands. |

Figure 10:
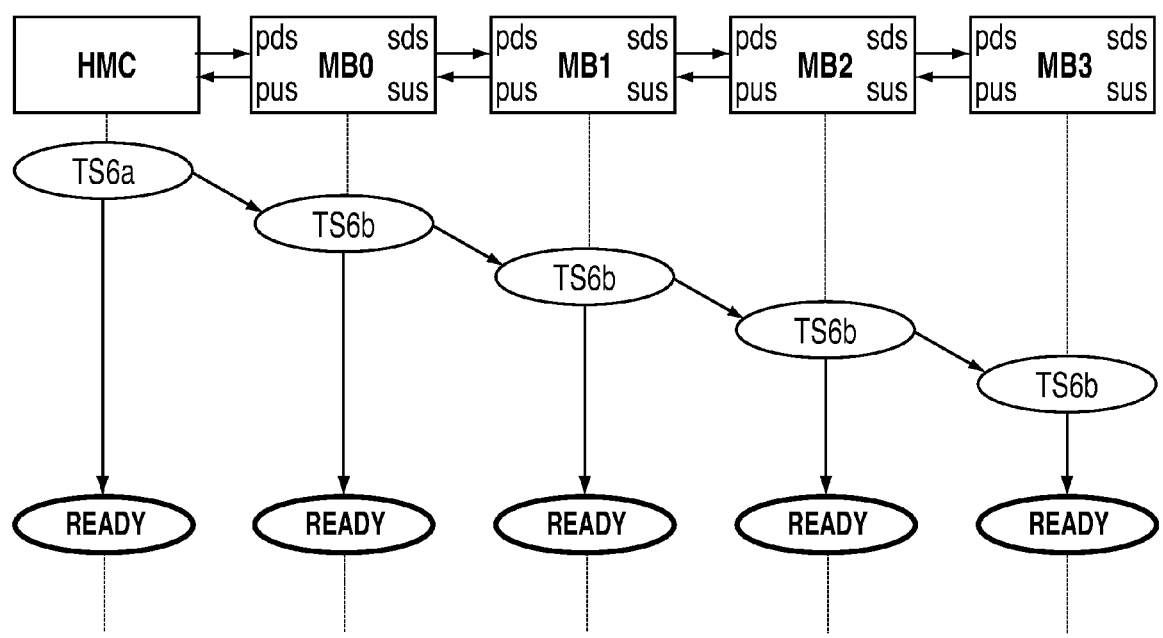
FIG. 10 depicts a process flow that may be implemented by training state TS6 in an exemplary embodiment.

FIG. 10 depicts a process flow that may be implemented by TS6 in an exemplary embodiment.

TS7: read data latency calculation and inter-channel de-skew. At this point in the power-up and initialization sequence, the memory channel is ready to send and receive high-speed information on a single channel of cascaded MBs. For multiple channels running in lock-step mode, inter-channel de-skewing is required in order to fully enable reading and writing from MB registers and SDRAMs. The read data latency of each de-skewed MB must be calculated and written into the appropriate initial frame latency (IFL) configuration register.

Each MB contains a fixed data pattern configuration register. During the read data latency and inter-channel de-skew process the host repeatedly reads this register from the first MB in each memory channel. The reads are spaced such that there is no read data buffer delay used by the operation. Register reads return 8 memory channel transfers of data. If the latency between channels is not equal, a maintenance command is used to configure additional upstream transmitter latency in the early MBs. The same command sequence is used to calculate the read data latency and load it into the de-skewed MB IFL registers. This process is repeated for each row of cascaded MBs in the memory channel.

The memory channel is now capable of reading and writing MB configuration register information and SDRAM initialization can begin.

SDRAM Interface Initialization. This step follows the memory channel high-speed link training states and includes the following procedures: memory delay line calibration; DDR3 SDRAM and RCD reset and initialization procedure; DDR3 read data gate delay optimization; read data de-skew; DDR3 read data strobe centering; and write leveling.

Memory Delay Line Calibration. Before any commands are issued on the DDR3 SDRAM interface the MB chip must have its memory delay lines calibrated. This compensates for specific process, voltage and temperature conditions that exist during power-on reset. The system control software issues the calibration maintenance command to each MB in the system either through the service interface or over the HMC. The MB internal logic performs the calibration operation and updates its maintenance command status register. When a positive calibration status is polled by system control software, initialization can proceed to the next step.

MB delay lines include voltage regulators that limit delay changes that result from voltage drift. However, delay changes from temperature (slow) and transistor aging effects (very slow) can occur. During run-time, the calibration maintenance command is issued periodically to compensate for this delay drift. The DDR3 SDRAMs should be placed in self-timed refresh mode for run time calibration operations to ensure the SDRAMs do not enter a lock-up state. The rate of calibration commands is configurable, based on system temperature drift conditions.

DDR3 SDRAM and RCD reset and initialization procedure. The DDR3 registering clock driver (RCD) and SDRAM devices have specific power up and initialization steps that are performed at this point in the initialization procedure. They include de-asserting reset, starting clocks, asserting CKE, issuing mode register set (MRS) and RCD control word writes, DLL enable and ZQ calibration. The specific requirements follow the documented DDR3 JEDEC specifications.

DDR3 read data gate delay optimization. DDR3 read data gate delay is a MB procedure that automatically configures the MB read data gate and termination delay settings using the DDR3 feature called "multi purpose register—fixed data pattern." The system control software issues the "read data gate delay optimization" maintenance command to each MB in the system either through the service interface or over the host through the memory controller. The MB sequentially places each memory rank enabled in its configuration registers into multi-purpose register (MPR) mode, performs read data gate delay optimization and updates its read data and strobe gate and termination delay settings based on the results. When a positive read data gate delay status is polled by system control software, initialization can proceed to the next step.

Read data de-skew. DDR3 read data de-skew is a MB procedure that automatically configures the per bit read data delay settings using the DDR3 fixed data pattern register. This procedure is initiated using the same maintenance command as read data strobe centering by setting the appropriate mode bit.

DDR3 read data strobe centering. DDR3 read data strobe centering is a MB procedure that automatically configures the MB read data strobe delay settings using the DDR3 feature called "multi purpose register—fixed data pattern." The system control software issues the "read data de-skew and data strobe centering" maintenance command to each MB in the system either through the service interface or over the host through the memory controller. The MB sequentially places each memory rank enabled in its configuration registers into MPR mode, performs read data strobe centering and updates its read data strobe delay settings based on the results. When a positive read data strobe centering status is polled by system control software, initialization can proceed to the next step.

Write leveling. Write leveling is a DDR3 feature and MB procedure that enables the automatic configuration of MB write data and strobe delay settings. The system control software issues the 'write leveling' maintenance command to each MB in the system either through the FSI or the HMC. The MB sequentially places each memory rank enabled in its configuration registers into write leveling mode, performs write leveling and updates its write data and strobe delay settings based on the results. When a positive write leveling status is polled by system control software, initialization is complete.

Memory channel repair and re-initialization. An exemplary embodiment includes a hardware driven memory channel repair and re-initialization process that is supported by the MBs in the enhanced cascaded memory system. It is initiated and controlled by the host memory controller in conjunction with the MB chips in the memory channel and starts from "functional mode" state. During normal, run-time operation the MB memory channel is not expected to run completely error-free. A small, non-zero bit error rate (BER) is common for this type of high-speed interface. Most of the bit errors will be corrected by the retry portion of the error recovery process. Memory channel repair and re-initialization will be entered if any retry operation fails. This process repairs hard and solid errors in the memory channel.

The standard memory channel repair and re-initialization process is initiated by the HMC driving the 'TS0_pdsck' SBC onto the memory channel. MB chips that are in functional mode and not already in the error recovery state (ERS) (see FIG. 3) will detect a DS CRC error from the SBC and enter the ERS. Hardware driven memory channel initialization proceeds normally through each link training state except TS1, which contains the MB configuration through the very slow FSI. TS1 is skipped during this process. After all of the link training states are performed, the HMC can issue the "exit self-timed refresh" command to the DDR3 SDRAMs, wait a specified time and begin executing the commands in its retry queue.

The MB chips can indirectly initiate the memory channel repair and re-initialization process. When an MB detects a persistent error that is not corrected by a simple retry operation it will stay in the ERS when it receives the "error acknowledge" command from the HMC. This will cause poisoned CRC to be sent upstream. The retry process will fail and signal the HMC to begin the repair and re-initialization process.

In an exemplary embodiment, the time from entry into the memory channel repair and re-initialization process to the issue on the retry command sequence is in the less than 10 milliseconds range. This time limit ensures other system components will not time-out during the repair and re-init process.

Fast repair and re-initialization. Not all systems can tolerate a 10 millisecond memory channel repair and re-initialization time limit. Such systems can design and configure their HMCs to drive the 'TS2_annc' SBC onto the memory channel and skip both TS0 and TS1. While this process is much faster (in the range of several 10 microseconds), memory channel clock errors will not be repaired.

Re-IPL. In an exemplary embodiment, the MB supports reset sequences that do not include powering off voltages. This is commonly referred to as a repeated initial program load (re-IPL). The MB memory must have been previously powered on in accordance with the power-on sequence specified above. If the global reset signal is active, the re-IPL must begin at step 1 of the power-on sequence, skipping power supply commands. The re-IPL may also begin at step 7 of the power-on sequence if the global reset is inactive during the re-IPL.

Memory preserving re-IPL. The MB supports a re-IPL sequence that preserves SDRAM memory contents. The MB includes a "memory preserving fence" bit in its MB control registers located in its service interface (FSI) logic. This bit is reset by the global reset during the power-on reset. When this bit is set by FSI commands, the MB will force the DDR3 RESET_N, (m[ab]_resetn) and clock enable, (m[ab]_cke) inactive.

In an exemplary embodiment, a memory preserving re-IPL sequence includes: 1. suspend memory commands on the memory channel; 2. send "enter self-timed refresh" command to DDR3 SDRAMs; 3. set "memory preserving fence" MB control register bit; 4. execute power-on reset sequence described above starting at step 7; and 5. reset "memory preserving fence" MB control register bit before issuing "exit self-timed refresh" command to MBs.

Quasi-Static Bit Communication (SBC) on a High-Speed Bus.

A high-speed bus may be used to communicate between memory modules in a memory system to increase memory system performance. Before the high-speed bus can be used to reliably communicate between the memory modules, configuration data may be exchanged between memory system components. In-band set-up and configuration methods transfer control information in frame headers, control packets or commands at a high-speed data rate to the memory modules. However, issues arise when high-speed data cannot be reliably transmitted, which may occur in conditions such as system start-up, link setup and training, or interconnect reset, leading to extended delays as operations are retried until successful.

In an exemplary embodiment, error correcting code protected quasi-static bit communication on a high-speed data bus is provided. Using quasi-static bit communication allows commands to be recognized when a sufficient number of bits remain static for a predetermined period of time without precise timing calibration that may be required for high-speed communication. Applying an error correcting code enables failures to be detected and corrected for a large number of commands.

An exemplary embodiment of the present invention as described herein provides error correcting code protected quasi-static bit communication on a high-speed bus that includes high-speed links. Quasi-static bit communication, also referred to as "static bit communication" or "SBC", can be used to control the sequence of link initialization and training phases to establish reliable communication on the high-speed bus. When error correction of an SBC sample is performed prior to checking for a static pattern, the error correction may be able to repair errors that would otherwise prevent the pattern from being static over a period of time. Thus there is an increased tolerance for errors and only a portion of the SBC sample needs to remain static for a predetermined period of time. In an exemplary embodiment, a large number of commands and transmission of setup data are used to control training sequences of the high-speed links to calibrate high-speed communication. The high-speed links may connect a number of daisy-chained devices, such as fully buffered memory channels of computer systems.

Reliability is improved by using a low-speed clock derived from a high-speed clock, as well as a sample counter to confirm that a sufficient number of bits on the high-speed bus have remained static for a predetermined period of time. The static bits may be used to distinguish SBC data from standard high-speed data communicated on the high-speed bus. The low-speed clock enables the transfer of data for configuration, training and calibration without additional clock conditioning, such as a phase locked-loop (PLL), which may be required for sampling reliably at the high-speed clock rate. Further reliability features may include the use of spare lanes to switch out defective bit lanes (e.g., bus wires) and clocks, as well as an error correcting code (ECC) for detection and repair of failed bit lanes. ECC protection allows identification of failing lanes. ECC codes can be designed to be able to repair transmitted data (error correction) and can further be enhanced in a way to detect a higher number of failures than what can be repaired (error detection). The latter feature is important in order not to attempt a repair in the presence of to many failures. Further repair counter-measures may be performed using the spare lanes.

In an exemplary embodiment, SBC is implemented as an SBC mode of operation for communicating on the high-speed bus at a reduced rate. A high-speed mode of operation also uses the high-speed bus for communicating at a high nominal speed. SBC mode transmitters drive an unscrambled, quasi-static bit pattern onto the high-speed bus for a large number (N0) of unit intervals (UI) or high-speed sample times. High-speed bus receivers include detection circuitry for a static pattern that includes repowering, latching, correction and decoding. In contrast, the high-speed mode of operation may use scrambled data patterns to achieve the transition density for maintaining bit lock. Switching bits pseudo-randomly for the high-speed mode provides '1' to '0' and '0' to '1' transitions even during extended idle times on the memory channel. These transitions can also prevent receiving circuitry from inadvertently mistaking idle time in high-speed mode as an SBC command.

Figure 11:
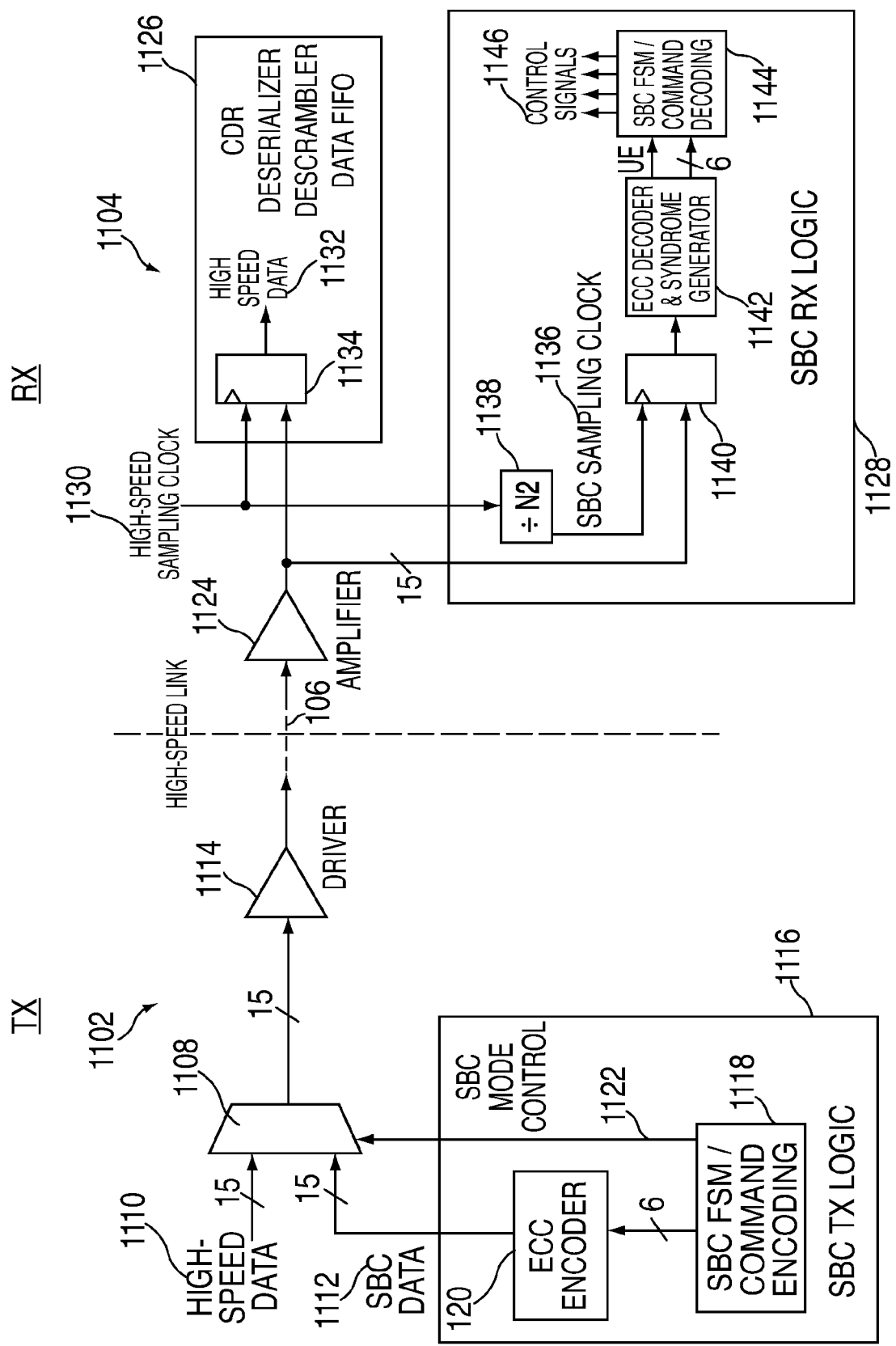
FIG. 11 depicts an example of a transmitter and receiver configuration for quasi-static bit communication that may be implemented by exemplary embodiments.

An example of a high-speed link with SBC circuitry is depicted in the block diagram of FIG. 11. Transmitting circuitry 1102 transmits data to receiving circuitry 1104 on a high-speed link 1106. The transmitting circuitry 1102 includes a multiplexer (mux) 1108 that can send either high-speed data 1110 or SBC data 1112 to driver 1114 to output on the high-speed link 1106. The transmitting circuitry 1102 may be included in a communication interface device, such as a memory interface device, for instance, a memory controller, buffer or hub, to transmit either the high-speed data 1110 or the SBC data 1112 to the receiving circuitry 1104. Similarly, the receiving circuitry 1104 may be included a communication interface device, such as a memory interface device, for instance, a memory controller, buffer or hub, to receive the high-speed data 1110 and the SBC data 1112. The high-speed data 1110 may include serialized frames of addresses, commands and data for reading or writing data, e.g., targeting memory devices on a memory module. The SBC data 1112 can include both commands (with or without additional data) and ECC bits as generated by SBC transmission logic 1116.

In an exemplary embodiment, the SBC transmission logic 1116 includes SBC finite state machine (FSM) and command encoding logic 1118 that drives an ECC encoder 1120 and provides SBC mode control 1122 to select between the inputs to the mux 1108. Although the SBC FSM and command encoding logic 1118 is depicted as a single functional block, it will be understood that it can be subdivided into separate functional blocks. The SBC FSM and command encoding logic 1118 can determine a particular command to send based upon a sequence of training states used to configure characteristics of devices coupled to the high-speed link 1106. In the example depicted in FIG. 11, six bits of SBC commands are output to the ECC encoder 1120. The ECC encoder 1120 generates ECC check bits to detect and correct for error conditions. In an exemplary embodiment, the ECC encoder 1120 produces a double error correcting, triple error detecting (DEC/TED) ECC with (15,6) binary encoding, where 9 bits are dedicated to the ECC. While the example depicted in FIG. 11 includes 6-bit SBC commands and 15-bit values transmitted from the transmitting circuitry 1102 to the receiving circuitry 1104, it will be understood that other bus widths, including SBC command and ECC widths are included within the scope of the invention.

The receiving circuitry 1104 may include an amplifier 1124 to repower data received on the high-speed link 1106. The amplifier 1124 can output data to both clock and data recovery (CDR) logic 1126 and SBC receiver logic 1128. The CDR logic 1126 and the SBC receiver logic 1128 receive a high-speed sampling clock 1130 for sampling data from the high-speed link 1106. The CDR 1126 performs processing of high-speed data 1132, which is captured via high-speed sampling logic 1134. The CDR 1126 may also include deserializing and descrambling logic to further condition the high-speed data 1132 that corresponds to the high-speed data 1110.

The SBC receiver logic 1128 derives SBC sampling clock 1136 from the high-speed sampling clock 1130, using clock divider 1138. In the example depicted in FIG. 11, the clock divider 1138 divides the high-speed sampling clock 1130 by a factor of N2. The SBC sampling clock 1136 drives the SBC sampling rate for SBC sampling logic 1140, which captures data output from the amplifier 1124. An ECC decoder and syndrome generator 1142 extracts the ECC check bits added by the ECC encoder 1120 and generates a 9-bit syndrome, and performs error detection and/or correction on the SBC command received. Although the ECC decoder and syndrome generator 1142 is depicted as a single functional block, it will be understood that it can be subdivided into separate functional blocks. The resulting SBC command is passed to SBC FSM/command decoding logic 1144 to decode the SBC command as generated by the SBC FSM/command encoding logic 1118. Again, while the SBC FSM/command encoding logic 1118 is depicted as a single functional block, it will be understood that it can be subdivided into separate functional blocks. The ECC decoder and syndrome generator 1142 may also provide the SBC FSM/command decoding logic 1144 with error information to assist in decoding the SBC command, e.g., to prevent reliance on an uncorrectable error (ULE) in the SBC command. The SBC FSM/command decoding logic 1144 outputs control signals 1146 which may drive other circuitry (not depicted).

SBC commands are only valid if a static pattern is detected for at least N1 UI, where N1<N0. SBC sampling is performed in parallel to the normal, full-speed data samples. The SBC sampling logic 1140 acquires SBC samples every N2 UI, where 1 UI<N2<N1. This scheme of sampling at a reduced rate facilitates timing closure in a link system that is not yet set up for reliable high-speed operation. Thus, when the SBC TX logic 1116 drives SBC commands with ECC over the high-speed link 1106 for at least N0 UI, the SBC RX logic 1128 need only detect a quasi-static pattern for the predetermined time period of N1 UI to confirm that an SBC command has been received. The difference between N0 and N1 can allow for settling and transition time between modes of operation. For example, the SBC TX logic 1116 may output the SBC data 1112 for 512 UI (where N0=512 UI) and the SBC RX logic 1128 may only need 48 UI (where N1=48 UI) to confirm that an SBC command has been received.

ECC protection of the SBC protocol allows error detection and correction, and efficient use of spare lanes. In daisy-chain configurations, such as in buffered memory channels, the SBC code is corrected in each receiver before repowered and driven onto the next link segment. One example of an ECC algorithm that can be used by the ECC encoder 1120 and the ECC decoder and syndrome generator 1142 is a DEC/TED ECC. Referring to the 15-bit lane example of FIG. 11, the DEC/TED ECC uses the 15 rightmost bits of a [16,7] encoding resulting in 6 corrected data bits from the 15 SBC lanes. Signal strands 14 down to 9 carry the data bits, SBC(5:0) and strands 8 down to 0 carry the check bits CB(8:0). The code is defined by the following parity check matrix 9×16 HGEN:

```
1 1 0 1 0 0 0 1 0 0 0 0 0 0 0 0
0 1 1 0 1 0 0 0 1 0 0 0 0 0 0 0
0 0 1 1 0 1 0 0 0 1 0 0 0 0 0 0
0 0 0 1 1 0 1 0 0 0 1 0 0 0 0 0
1 1 0 1 1 1 0 0 0 0 0 1 0 0 0 0
0 1 1 0 1 1 1 0 0 0 0 0 1 0 0 0
```

```
1 1 1 0 0 1 1 0 0 0 0 0 0 1 0 0
1 0 1 0 0 0 1 0 0 0 0 0 0 0 1 0
1 0 0 1 1 1 1 0 0 0 0 0 0 0 0 1
```

Note that the last 9 columns of HGEN form an identity matrix that represents the check bits. Each check bit is generated by XORing the data bits at positions indicated by the ones in the corresponding row vector in HGEN, (with leftmost column assumed zero).

CB(8)=SBC(5)^SBC(3)

CB(7)=SBC(5)^SBC(4)^SBC(2)

CB(6)=SBC(4)^SBC(3)^SBC(1)

CB(5)=SBC(3)^SBC(2)^SBC(0)

CB(4)=SBC(5)^SBC(3)^SBC(2)^SBC(1)

CB(3)=SBC(5)^SBC(4)^SBC(2)^SBC(1)^SBC(0)

CB(2)=SBC(5)^SBC(4)^SBC(1)^SBC(0)

CB(1)=SBC(4)^SBC(0)

CB(0)=SBC(3)^SBC(2)^SBC(1)^SBC(0)

When 15-bit data is received at the ECC decoder and syndrome generator 1142, a 9-bit syndrome is generated. The syndrome is logically the received check bits XORed with the check bits regenerated from the received data. Syndrome decoding is used to determine if there are errors in the received data. If there are errors, the syndrome is decoded to indicate the error positions so that the erroneous data bits can be corrected.

Figure 12:
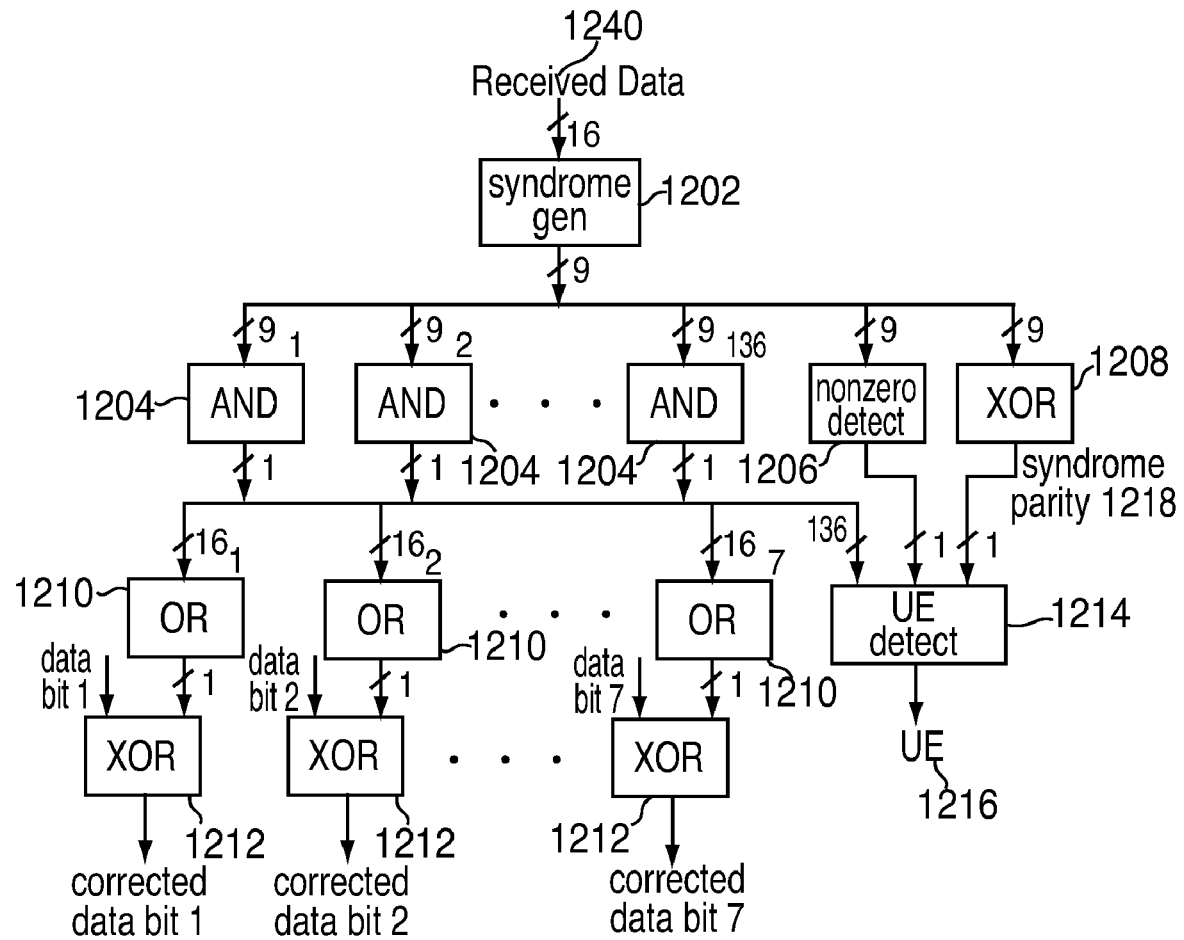
FIG. 12 depicts a block diagram for error correcting logic that may be implemented by exemplary embodiments.

FIG. 12 depicts a block diagram for error correcting logic that may be implemented by the ECC decoder and syndrome generator 1142 of FIG. 11. Syndrome generator 1202 can generate a syndrome as previously described, where received data 1240 is an SBC sample. Although the example depicted in FIG. 11 uses 15 bits, the syndrome generator 1202 can support a greater number of bits, e.g., 16 bits, where the 16th bit of the received data 1240 may be forced to a value of zero. The resulting syndrome value from the syndrome generator 1202 is passed to multiple AND circuits 1204, nonzero detect 1206 and XOR circuit 1208. If all syndrome bits are zero, there is no error; otherwise, there is an error.

There can be 120 double errors and 16 single errors for a total of 136 error patterns in an ECC word of 16 bits. Associated with these 136 error patterns are 136 distinct correctable error (CE) syndromes. Let SCE be the set CE syndromes. SCE can be divided into two subsets: the set of 16 single error syndromes SCE1 and the set of 120 double error syndromes SCE2. The elements of SCE1 are the column vectors of HGEN and the elements of SCE2 are the XORs of all possible pairs of the column vectors of HGEN.

Let sp be the parity of the syndrome of the received data. The number of errors in the received data is odd if sp is one, and the number of errors is even if sp is zero. Thus, if sp is one, the syndrome is matched against the elements of SCE1 to see if there is a single error. If sp is zero and the syndrome is not all zero, the syndrome is matched against the elements of SCE2 to see if there are two errors. If (sp=1) and (syndrome does not belong to SCE1), or (sp=0) and (syndrome does not belong to SCE2) and (syndrome is not all zero), then there are uncorrectable errors (UE).

The set of all non-zero CE syndromes can be grouped into 16 subsets G(i), i=1 ... 16, so that if the errors are correctable and the syndrome belongs to G(i), bit position i is in error. The elements of G(i) consist of the column i of HGEN plus the XOR of column i and any other columns of HGEN. There are 16 elements in each of G(i). Referring to FIG. 12, 136 9-way AND circuits 1204 can be used to determine if the syndrome is an element of SCE, excluding the all zero syndrome from the CE syndrome set. The inputs to each AND circuit 1204 are either positive or negative phases of the syndrome bits. The 7 16-way OR circuits 1210 generate error indicators for all data bits. The inputs to each OR circuit 1210 are the outputs of the AND circuits 1204. The received data 1240 are inverted by XORing each data bit with the error indicators output from the OR circuits 1210 using XOR circuits 1212. UE detect 1214 sets UE 1216 if ((syndrome parity 1218 output from the XOR circuit 1208 is set) and (syndrome does not belong to SCE1)), or ((syndrome parity 1218 is not set) and (syndrome does not belong to SCE2) and (syndrome is not all zero)). Corrected bits 2-7 are used for outputting a corrected 6-bit SBC command, which may also be referred to as an SBC pattern until the pattern has statically persisted for a sufficient period of time to determine that it is an SBC command.

Figure 13:
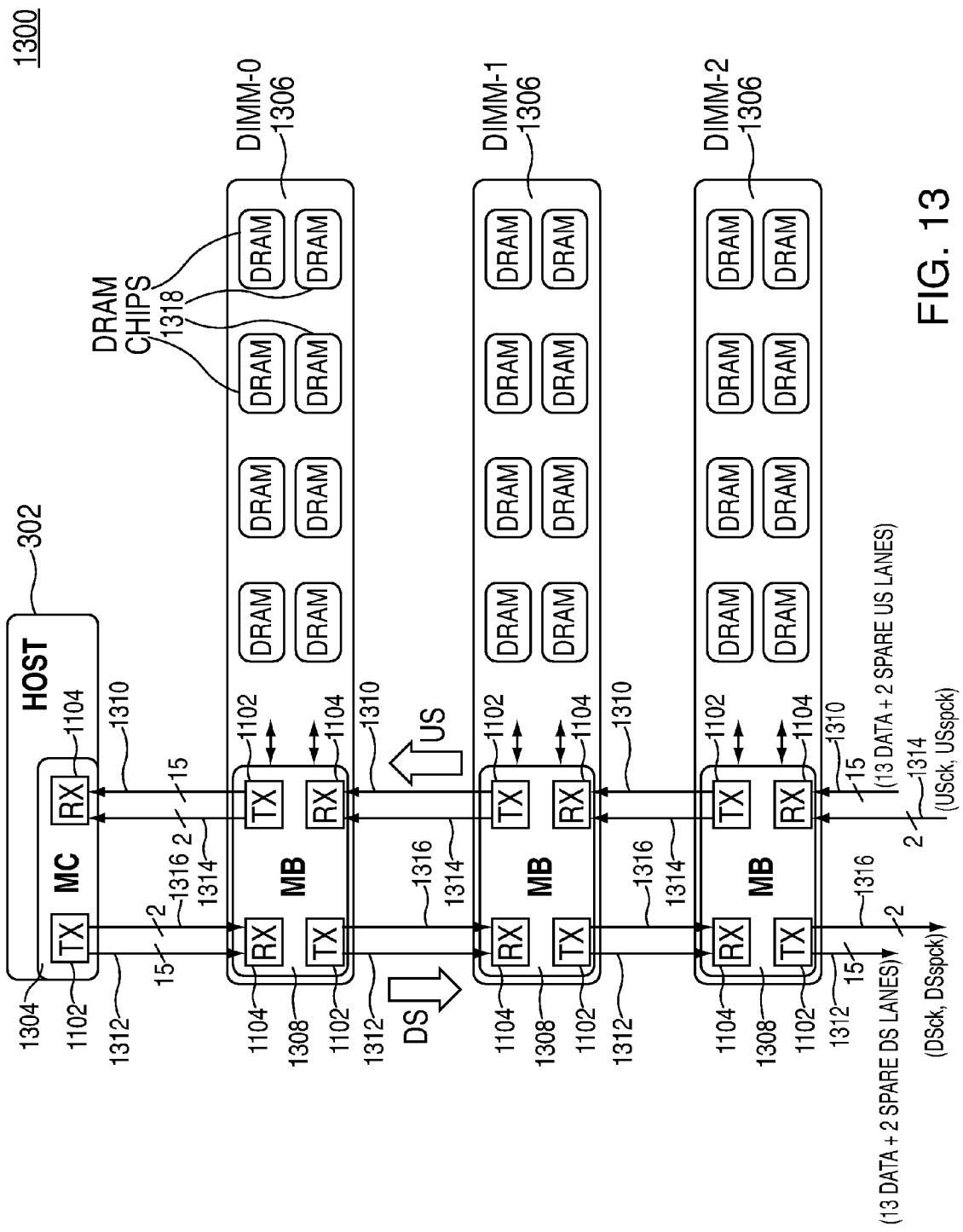
FIG. 13 depicts a memory system that includes fully buffered DIMMs communicating via high-speed upstream and downstream busses using error correcting code protected quasi-static bit communication that may be implemented by exemplary embodiments.

Turning now to FIG. 13, an example of memory system 1300 that includes fully buffered dual in-line memory modules (DIMMs) communicating via high-speed upstream and downstream links using error correcting code protected quasi-static bit communication is depicted. A host processing system 1302 includes a memory controller (MC) 1304 and a number of DIMMs 1306 as part of the memory system 1300. Each DIMM 1306 includes a memory buffer (MB) 1308 that receives and drives 15 data lanes, both in upstream (US) and downstream (DS) directions. In an exemplary embodiment, the US busses 1310 and DS busses 1312 include 2 spare lanes; thus, only 13 of the 15 lanes are needed for the high-speed transmission of commands, address and data, as the 2 spare lanes can be used to replace up to 2 failed lanes. A high-speed clock and spare high-speed clock are sent in both the upstream and downstream directions as upstream clock lanes 1314 and downstream clock lanes 1316. The MC 1304 and the MBs 1308 include the transmitting circuitry 1102 and receiving circuitry 1104, and thus are examples of apparatuses for practicing the invention. Each of the DIMMs 1306 can include multiple dynamic random access memory (DRAM) chips 1318, as well as other components known in the art, e.g., resistors, capacitors, etc.

While the memory system 1300 of FIG. 13 includes 15 US and DS lanes for the US and DS busses 1310 and 1312, the number of lanes can vary between US and DS lanes. For example, the DS bus 1312 may include 20 lanes with 2 spares, while the US bus 1310 includes 15 lanes with 2 spares. In such a mismatch, the SBC mode can utilize the lesser number of lanes for both US and DS communication. Additionally, when fewer than all lanes are utilized for SBC mode, lane rotation may be employed to test the unused lanes. Alternatively, the unused lanes can serve as additional spares.

Although only a single memory channel is shown in FIG. 13 connecting the MC 1304 to a single MB 1308, systems produced with these modules may include more than one discrete memory channel from the memory controller, with each of the memory channels operated singly (when a single channel was populated with modules) or in parallel (when two or more channels where populated with modules) to achieve the desired system functionality and/or performance.

The SBC command bits may be encoded and decoded as shown in the following table:

TABLE 11

| SBC (5:0) | DS coding | US coding |
| --- | --- | --- |
| 000000 | NOP | NOP |
| 000100 | TrainingState0_DSck | Reserved |
| 000101 | TrainingState0_DSspck | Reserved |
| 000110 | TrainingState0_USck | Reserved |
| 000111 | TrainingState0_USspck | Reserved |
| 001000 | TrainingState2_announce | TrainingState2_acknowledge |
| 001001 | TrainingState3_announce | TrainingState3_acknowledge |
| 001010 | TrainingState4_announce | TrainingState4_acknowledge |
| 1cdddd | TrainingState_[clock,data] | TrainingState_[clock,data] |
| 011111 | TrainingState_done | TrainingState_done |
| Others | Reserved | Reserved |

In this example, the SBC command is used to start and acknowledge a number of training states during startup of the memory system 1300 or after a reset condition. For TrainingState0 (clock detection and repair), the clock lane used for the forwarded clock on a given link segment is also indicated, where DSck stands for "use downstream default clock lane" of downstream clock lanes 1316, and USspck stands for "use upstream spare clock lane" of upstream clock lanes 1314, etc. Cascaded US acknowledge SBC code signals to the host processing system 1302 that all downstream MBs 1308 are ready for a given training state. At the end of a training state, the command TrainingState_done cascades downstream and upstream through the MC 1304 and MBs 1308. The SBC FSM/command encoding logic 1118 handling a certain training state decides whether an SBC command is terminated in the MB 1308 (e.g., at the SBC receiver logic 1128 in the same MB 1308) or forwarded to the driver 1114 for cascading to another MB 1308 or the MC 1304.

During training states the data bus on each link segment (US bus 1310 and/or DS bus 1312) can enter a high-speed mode for various tasks such as impedance trimming, offset trimming, lane training (signal analysis, phase locking, equalization, bit error rate optimization), scrambler/descrambler synchronization, lane-to-lane deskewing and first-in-first-out (FIFO) optimization. After final bit lock and packet lock have been achieved, the SBC logic (e.g., SBC transmission logic 1116 and/or SBC receiver logic 1128) can be disabled (or even powered down) during the remaining training states and during normal high-speed operation.

Some training states require the exchange of data between transmitters and receivers of a link segment, such as lane repair vectors indicating failed lanes and spare lanes to be used on each segment of the daisy chain, trimming parameters or equalization coefficients. For this purpose, the SBC code TrainingState_[clock,data] is used to transmit 4 bits of data (dddd) per SBC. Larger data blocks can be continuously transmitted by using the c bit as a pseudo-clock indicating even and odd SBC cycles.

In one embodiment, the memory system 1300 utilizes the following values while operating in the SBC mode: N0=256 UI, N1=128 UI (32 SBC samples), and N2=4 UI. Thus, for this example, the SBC transmission logic 1116 of the transmitting circuitry 1102 drives an unscrambled static bit pattern for 256 UI and the SBC receiver logic 1128 of the receiving circuitry 1104 detects patterns on the US bus 1310 and/or the DS bus 1312 that are stable for at least 128 UI (32 SBC samples). To allow for up to 2 defective lanes, only 13 lanes need to be stable for N1 UIs, whereas the other lanes are forced to a value of 0. In case less than 13 lanes are stable for N1 UIs, all received SBC bits are forced to the value of 0 (decoded as SBC NOP). The SBC receiver logic 1128 latches channel content every 4 UIs, where the UIs are in reference to the high-speed clocks on the upstream clock lanes 1314 and downstream clock lanes 1316. Thereby, the SBC samples are captured in parallel to normal, high-speed frame samples used to access the DRAM chips 1318.

Figure 14:
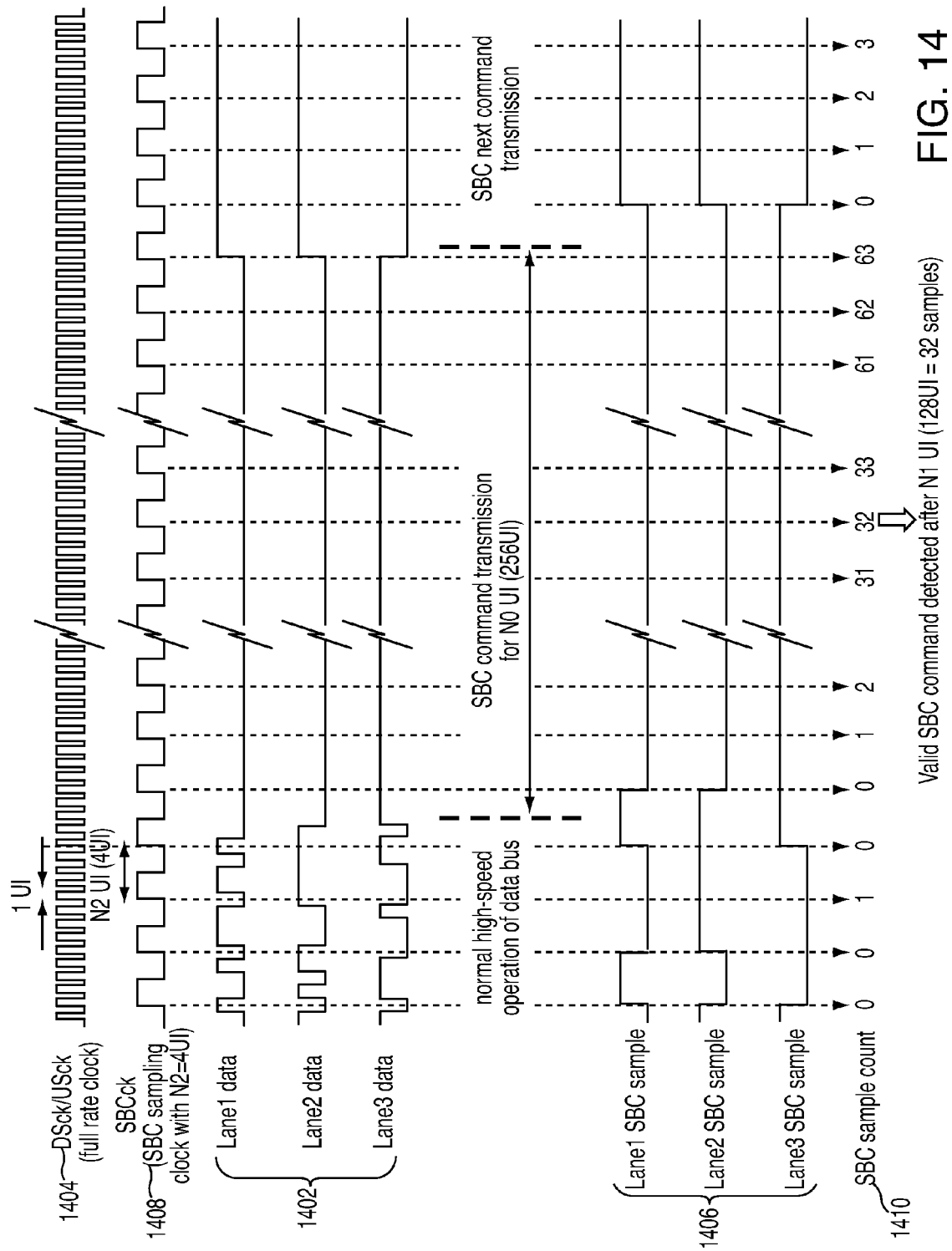
FIG. 14 depicts exemplary timing of high-speed data versus SBC data with respect to clock signals that may be implemented by exemplary embodiments.

FIG. 14 illustrates a timing diagram that further describes the relationships between normal high-speed operation and SBC operation in the memory system 1300 of FIG. 13. For ease of explanation only 3 lanes are depicted in FIG. 14, which may represent US lanes or DS lanes. Lanes 1-3 1402 depict example data sampled in reference to full rate clock 1404, e.g., USck or DSck of upstream clock lanes 1314 and downstream clock lanes 1316. Lanes 1-3 1406 are SBC samples of the same data on lanes 1-3 1402, but are sampled with the reduced rate of SBC sampling clock (SBCck) 1404. SBC samples for are counted as SBC sample count 1410, which may be incorporated in the SBC FSM/command decoding logic 1144 of the receiving circuitry 1104, as long as the pattern on at least 13 lanes does not change. A valid SBC command is detected after N1 UI (N1/N2 SBC samples) of unchanged patterns.

Figure 15:
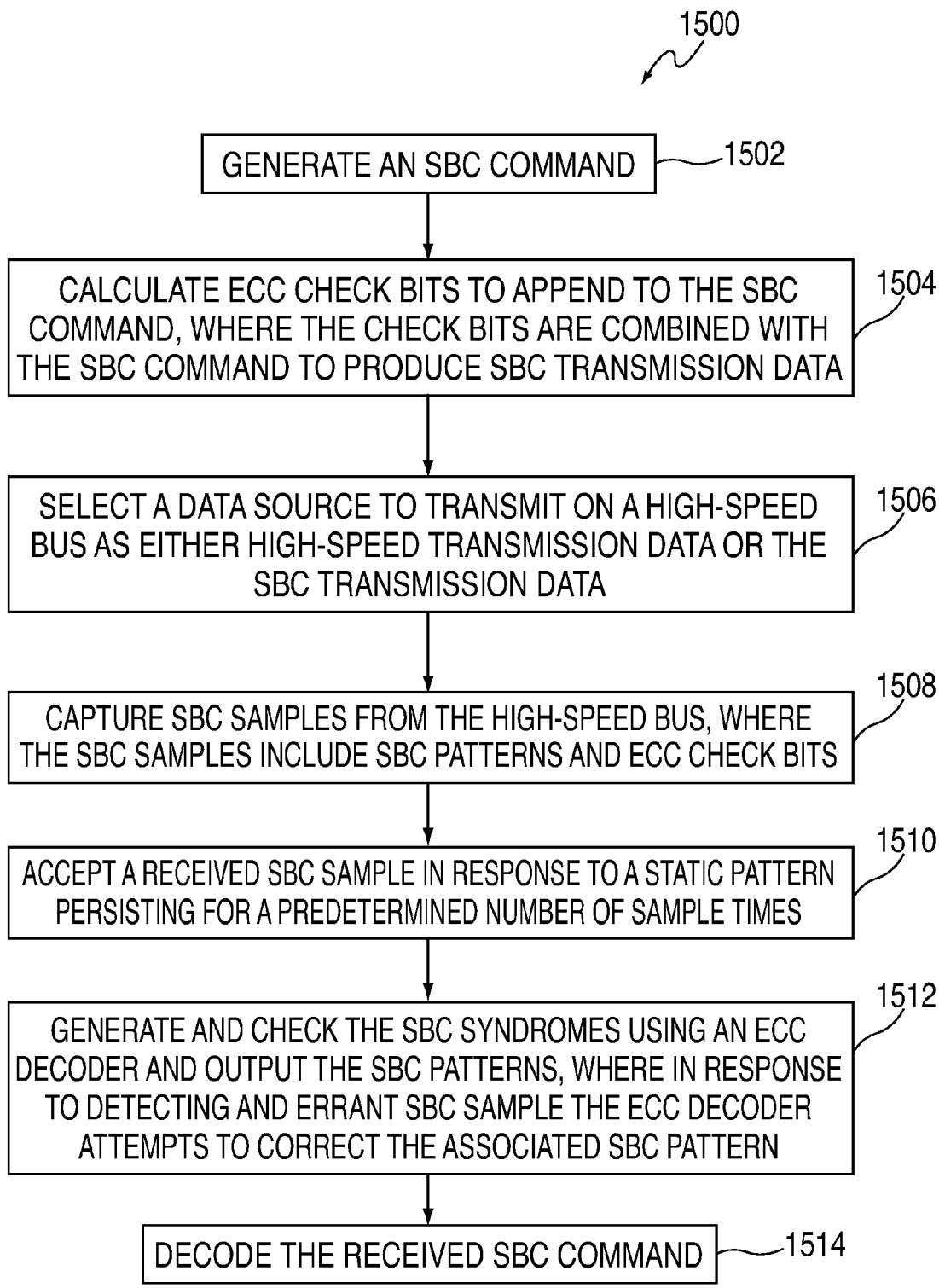
FIG. 15 depicts an exemplary process for providing error correcting code protected quasi-static bit communication that may be implemented by exemplary embodiments.

FIG. 15 depicts a process 1500 for providing error correcting code protected quasi-static bit communication that may be implemented by an exemplary embodiment as described in reference to FIGS. 11 and 13. For example, the process 1500 may be implemented in the MC 1304 and/or the MBs 1308 of FIG. 13. At block 1502, the SBC transmission logic 1116 generates an SBC command. The SBC command can be a "start training state" command to perform calibration or lane repair using one or more spare lanes, such as spare lanes of US and DS busses 1310 and 1312, as well as spare upstream and downstream clocks of upstream clock lanes 1314 and downstream clock lanes 1316. Calibration can include a variety of optimization tasks that affect signaling parameters such as phase locking, impedance trimming, scrambling, de-skewing, equalization and other such adjustments to improve high-speed data reliability.

At block 1504, the SBC transmission logic 1116 calculates ECC check bits to append to the SBC command. The check bits are combined with the SBC command to produce SBC transmission data. At block 1506, the mux 1108 selects a data source to transmit on the high-speed link 1106 (which may be US bus 1310 or DS bus 1312) as either high-speed data 1110 or the SBC data 1112 for transmission. The SBC transmission logic 1116 can drive the selection using SBC mode control 1122.

At block 1508, the SBC receiver logic 1128 captures SBC samples from the high-speed link 1106 using the SBC sampling logic 1140. The SBC samples include ECC check bits and SBC patterns. If there are no errors and the transmitting circuitry 1102 is operating in SBC mode, then the received ECC check bits are equal to the transmitted check bits, and a received SBC pattern is equal to a transmitted SBC command. However, there may be inequalities if an error occurred or the transmitting circuitry 1102 actually sent high-speed data, such as a memory access command.

At block 1510, the SBC FSM/command decoding logic 1144 detects a received SBC command in response to a static pattern persisting in the SBC patterns for a predetermined number of the SBC samples. For example, when the SBC pattern persists for N1 unit intervals, the SBC pattern is determined to be an SBC command that can be further decoded; however, if the pattern changes before the predetermined number of the SBC samples are counted, then the SBC pattern is not treated as an actual SBC command. This prevents high-speed commands from being interpreted as SBC commands since both can be sent on the same high-speed link 1106. Parallel sampling for high-speed data 1132 can be performed while capturing SBC data, although the slower SBC sampling clock 1136 may be used by the SBC sampling logic 1140 to ease timing closure.

At block 1512, the ECC decoder and syndrome generator 1142 checks the SBC syndromes from received check bits and outputs the SBC patterns. In response to detecting an errant SBC sample, the ECC decoder and syndrome generator 1142 attempts to correct the associated SBC pattern. For example, the ECC decoder and syndrome generator 1142 may be able to correct up to 2 bit errors, and detect 3 bit errors but not correct the 3 bit errors. The SBC pattern, corrected or uncorrected, is passed to the SBC FSM/command decoding logic 1144 for further processing. The ECC decoder and syndrome generator 1142 may also notify the SBC FSM/command decoding logic 1144 of any uncorrected errors.

At block 1514, the SBC FSM/command decoding logic 1144 decodes the received SBC command. The SBC command can trigger a number of events that support initialization and configuration of communication interfaces as previously described.

Figure 16:
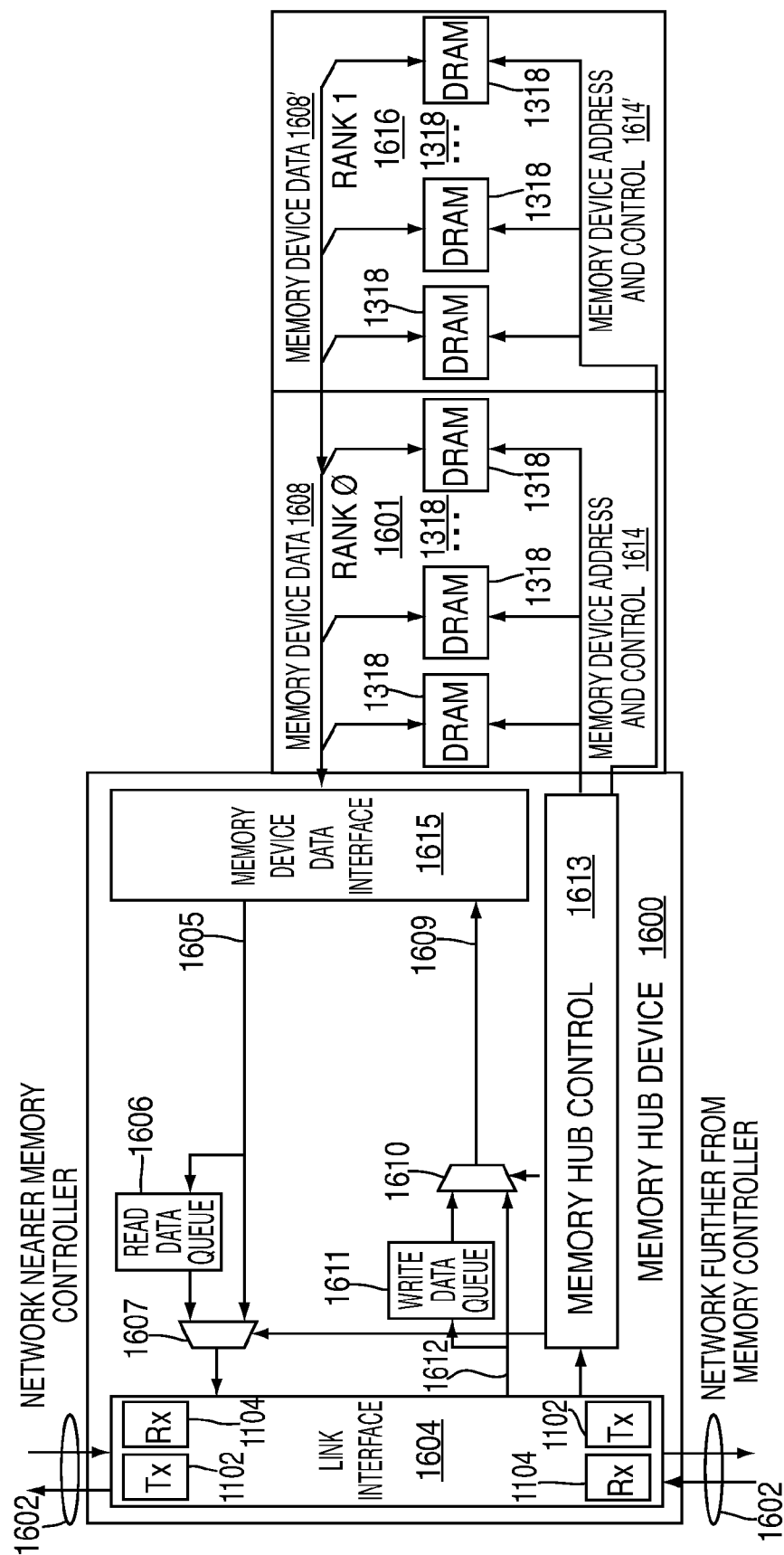
FIG. 16 depicts a memory hub device coupled with multiple ranks of memory devices that may be implemented by exemplary embodiments.

FIG. 16 depicts a block diagram of an exemplary memory hub device 1600 including a link interface 1604 for providing the means to re-synchronize, translate and re-drive high speed memory access information to associated DRAM devices 1318 and/or to re-drive the information downstream on memory bus 1602 as applicable based on the memory system protocol. The architecture depicted in FIG. 16 may be planar or integrated on a DIMM. The memory hub device 1600 is a type of memory buffer device, such as the MB 1308 of FIG. 13. The memory hub device 1600 supports multiple ranks of DRAM 1318 as separate groupings of memory devices using a common hub. The link interface 1604 includes transmitting circuitry 1102 and receiving circuitry 1104 to support SBC communication with ECC protection in upstream and downstream directions on memory bus 1602. Data, which may include SBC commands or high-speed data, are received by the link interface 1604 from an upstream memory hub device 1600 or from memory controller 1304 (directly or via an upstream memory hub device controller 1600) via the memory bus 1602. The memory device data interface 1615 manages the technology-specific data interface with the memory devices 1318 and controls the bi-directional memory data bus 1608. The memory hub control 1613 responds to access request packets by responsively driving the memory device 1318 technology-specific address and control bus 1614 (for memory devices in Rank 0 1601) or address and control bus 1614' (for memory devices in Rank 1 1616) and directing the read data flow 1607 and write data flow 1610 selectors. The link interface 1604 decodes the packets and directs the address and command information directed to the local hub device 1600 to the memory hub control 1613. Memory write data from the link interface 1604 can be temporarily stored in the write data queue 1611 or directly driven to the memory devices 1318 via the write data flow selector 1610 and internal bus 1612, and then sent via internal bus 1609 and memory device data interface 1615 to memory device data bus 1608. Memory read data from memory device(s) 1318 can be queued in the read data queue 1606 or directly transferred to the link interface 1604 via internal bus 1605 and read data selector 1607, to be transmitted on the upstream bus 1602 as a read reply packet.

Figure 17:
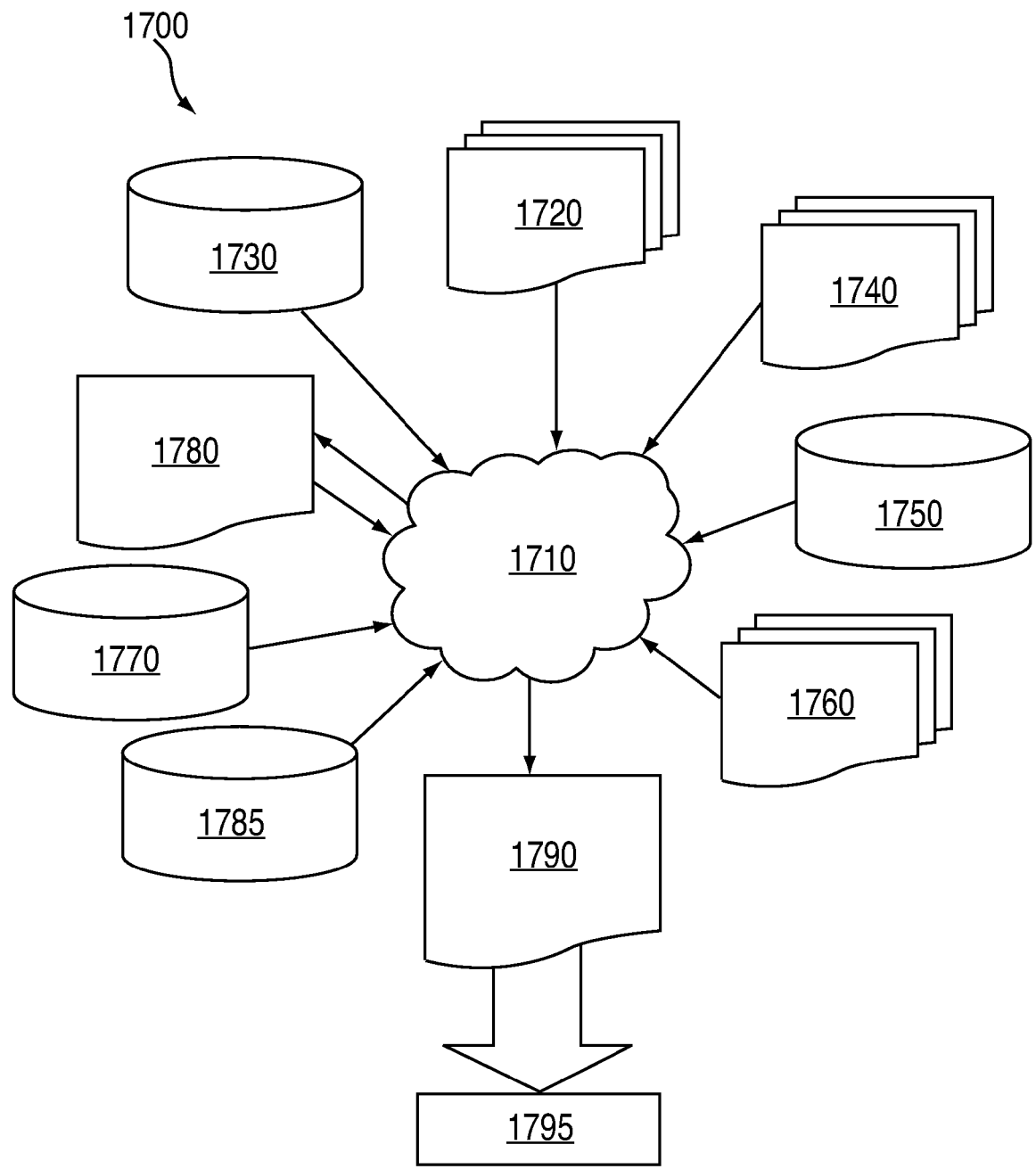
FIG. 17 is a flow diagram of a design process used in semiconductor design, manufacture, and/or test.

FIG. 17 shows a block diagram of an exemplary design flow 1700 used for example, in semiconductor IC logic design, simulation, test, layout, and manufacture. Design flow 1700 includes processes and mechanisms for processing design structures or devices to generate logically or otherwise functionally equivalent representations of the design structures and/or devices described above and shown in FIGS. 1-16. The design structures processed and/or generated by design flow 1700 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Design flow 1700 may vary depending on the type of representation being designed. For example, a design flow 1700 for building an application specific IC (ASIC) may differ from a design flow 1700 for designing a standard component or from a design flow 1700 for instantiating the design into a programmable array, for example a programmable gate array (PGA) or a field programmable gate array (FPGA) offered by Altera® Inc. or Xilinx® Inc.

FIG. 17 illustrates multiple such design structures including an input design structure 1720 that is preferably processed by a design process 1710. Design structure 1720 may be a logical simulation design structure generated and processed by design process 1710 to produce a logically equivalent functional representation of a hardware device. Design structure 1720 may also or alternatively comprise data and/or program instructions that when processed by design process 1710, generate a functional representation of the physical structure of a hardware device. Whether representing functional and/or structural design features, design structure 1720 may be generated using electronic computer-aided design (ECAD) such as implemented by a core developer/designer. When encoded on a machine-readable data transmission, gate array, or storage medium, design structure 1720 may be accessed and processed by one or more hardware and/or software modules within design process 1710 to simulate or otherwise functionally represent an electronic component, circuit, electronic or logic module, apparatus, device, or system such as those shown in FIGS. 1-16. As such, design structure 1720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1710 preferably employs and incorporates hardware and/or software modules for synthesizing, translating, or otherwise processing a design/simulation functional equivalent of the components, circuits, devices, or logic structures shown in FIGS. 1-16 to generate a netlist 1780 which may contain design structures such as design structure 1720. Netlist 1780 may comprise, for example, compiled or otherwise processed data structures representing a list of wires, discrete components, logic gates, control circuits, I/O devices, models, etc. that describes the connections to other elements and circuits in an integrated circuit design. Netlist 1780 may be synthesized using an iterative process in which netlist 1780 is resynthesized one or more times depending on design specifications and parameters for the device. As with other design structure types described herein, netlist 1780 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 1710 may include hardware and software modules for processing a variety of input data structure types including netlist 1780. Such data structure types may reside, for example, within library elements 1730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1740, characterization data 1750, verification data 1760, design rules 1770, and test data files 1785 which may include input test patterns, output test results, and other testing information. Design process 1710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1710 without deviating from the scope and spirit of the invention. Design process 1710 may also include modules for performing standard circuit design processes such as timing analysis, verification, design rule checking, place and route operations, etc.

Design process 1710 employs and incorporates logic and physical design tools such as HDL compilers and simulation model build tools to process design structure 1720 together with some or all of the depicted supporting data structures along with any additional mechanical design or data (if applicable), to generate a second design structure 1790. Design structure 1790 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 1720, design structure 1790 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-16. In one embodiment, design structure 1790 may comprise a compiled, executable HDL simulation model that functionally simulates the devices shown in FIGS. 1-16.

Design structure 1790 may also employ a data format used for the exchange of layout data of integrated circuits and/or symbolic data format (e.g. information stored in a GDSII (GDS2), GL1, OASIS, map files, or any other suitable format for storing such design data structures). Design structure 1790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-16. Design structure 1790 may then proceed to a stage 1795 where, for example, design structure 1790: proceeds to tape-out, is released to manufacturing, is released to a mask house, is sent to another design house, is sent back to the customer, etc.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The capabilities of the present invention can be implemented in software, firmware, hardware or some combination thereof.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Exemplary embodiments include a computing system with one or more processors and one or more I/O units (e.g., requestors) interconnected to a memory system that contains a memory controller and one or more memory devices. In exemplary embodiments, the memory system includes a processor or memory controller communicating with one or more hub devices (also referred to as "hub chips") which are attached to one or more ports or channels of the memory controller. The memory controller channels may be operated in parallel, thereby providing an increased data bus width and/or effective bandwidth, operated separately, or a combination therein as determined by the application and/or system design. The hub devices connect and interface to the memory devices either by direct connection (e.g. wires) or by way of one or more intermediate devices such as external buffers, registers, clocking devices, conversion devices, etc. In exemplary embodiments the computer memory system includes a physical memory array comprised of one or more volatile and/or non-volatile storage devices for storing such information as data and instructions. In exemplary embodiments, the hub-based computer memory system has memory devices attached to a communication hub device that is connected to a memory control device (e.g., a memory controller). Also in exemplary embodiments, the hub device is located on a memory module (e.g, a single substrate or assembly that includes two or more hub devices that are cascaded interconnected to each other (and may further connect to another hub device located on another memory module) via the cascade interconnect, daisy chain and/or other memory bus structure.

Hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device receives and generally translates and re-drives at least a portion of the received information in the memory access request(s) to the memory devices to initiate such operations as the storing of "write" data from the hub device or to provide "read" data to the hub device. Data read from the memory device(s) is generally encoded into one or more communication packet(s) and transmitted through the memory bus(es) to the memory controller or other requester—although the data may also be used by one or more of the hub devices (e.g. during memory "self-testing") or by another device having access to the hub, such as a service processor, test equipment, etc.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links (e.g. memory channels or ports) to connect to one or more hub chips and/or memory devices.

The memory modules may be implemented by a variety of technologies including a dual in-line memory module (DIMM), a single in-line memory module (SIMM), a triple in-line memory module (TRIMM), and quad in-line memory module (QUIMM), various "small" form-factor modules (such as small outline DIMMs (SO DIMMs), micro DIMMs, etc) and/or other memory module or card structures. In general, a DIMM refers to a circuit board which is often comprised primarily of random access memory (RAM) integrated circuits or die on one or both sides of the board, with signal and/or power contacts also on both sides, along one edge of the board that are generally have different functionality that the directly and/or diagonally opposed contacts. This can be contrasted to a SIMM which is similar is composition but having opposed contacts electrically interconnected and therefore providing the same functionality as each other. For TRIMMs and QUIMMs, at least one side of the board includes two rows on contacts, with other board types having contacts on multiple edges of the board (e.g. opposing and/or adjacent edges on the same side of the board), in areas away from the board edge, etc. Contemporary DIMMs includes 168, 184, 240, 276 and various other signal pin or pad counts, whereas past and future memory modules will generally include as few as tens of contacts to hundreds of contacts. In exemplary embodiments described herein, the memory modules may include one, two or more hub devices.

In exemplary embodiments, the memory bus is constructed using point-to-point connections between hub devices and/or a hub device and the memory controller, although other bus structures such as multi-drop busses may also be used. When separate "upstream" and "downstream" (generally unidirectional) busses are utilized (together comprising the memory "bus"), the "downstream" portion of the memory bus, referred to as the downstream bus, may include command, address, data and other operational, initialization or status information being sent to one or more of the hub devices that are downstream of the memory controller. The receiving hub device(s) may simply forward the information to the subsequent hub device(s) via bypass circuitry; receive, interpret and re-drive the information if it is determined by the hub(s) to be targeting a downstream hub device; re-drive some or all of the information without first interpreting the information to determine the intended recipient; or perform a subset or combination of these functions.

The upstream portion of the memory bus, referred to as the upstream bus, returns requested read data and/or error, status or other operational information, and this information may be forwarded to the subsequent hub devices and/or the memory control device(s) via bypass circuitry; be received, interpreted and re-driven if it is determined by the hub(s) to be targeting an upstream hub device and/or memory controller in the processor complex; be re-driven in part or in total without first interpreting the information to determine the intended recipient; or perform a subset or combination of these functions.

In alternate exemplary embodiments, the point-to-point bus includes a switch, re-drive or bypass mechanism which results in the bus information being directed to one of two or more possible hub devices during downstream communication (communication passing from the memory controller to a hub device on a memory module), and which may also direct upstream information (communication from a hub device on a memory module toward the memory controller), often by way of one or more upstream hub devices. Further embodiments include the use of continuity modules, such as those recognized in the art, which, for example, can be placed between the memory controller and a first populated memory module (e.g., a memory module that includes a hub device that is in communication with one or more memory devices), in a cascade interconnect memory system, such that any intermediate module positions between the memory controller and the first populated memory module includes a means by which information passing between the memory controller and the first populated memory module device can be received even if the one or more intermediate module position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device/module. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include conventional main memory storage devices such as one or more volatile memory device(s). In other exemplary embodiments, the continuity or re-drive function may be comprised as a hub device that is not placed on a memory module (e.g. the one or more hub device(s) may be attached directly to the system board or attached to another carrier), and may or may not include other devices connected to it to enable functionality.

In exemplary embodiments, the memory system includes one or more hub devices on one or more memory modules connected to the memory controller via one or more cascade interconnect memory buses, however one or more other bus structure(s) or a combination of bus structures may be implemented to enable communication such as point-to-point bus(es), multi-drop bus(es) or other shared or parallel bus(es), often allow various means of communication (e.g. including both high speed and low speed communication means). Depending on the signaling methods used, the intended operating frequency range, space, power, cost, and other constraints, various alternate bus structures may also be considered. A point-to-point bus may provide optimal performance (e.g. maximum data rate) in systems produced with high frequency signaling utilizing electrical interconnections, due to the reduced signal degradation that may occur as compared to bus structures having branched signal lines (such as "T" nets, multi-drop nets or other forms of "stubs". However, when used in systems requiring communication with a large number of devices and/or memory subsystems, this method will often result in significant added component cost, increased latency for distant devices and/or increased system power, and may further reduce the total memory density in a given volume of space due to the need for intermediate buffering and/or re-drive of the bus(es).

Although generally not shown in the Figures, the memory modules or hub devices may also include one or more separate bus(es), such as a "presence detect" (e.g. a module serial presence detect bus), an I2C bus, a JTAG bus, an SMBus or other bus(es) which are primarily used for one or more purposes such as the determination of the hub device an/or memory module attributes (generally after power-up), the configuration of the hub device(s) and/or memory subsystem(s) after power-up or during normal operation, bring-up and/or training of the high speed interfaces (e.g. bus(es)), the reporting of fault or status information to the system and/or testing/monitoring circuitry, the determination of specific failing element(s) and/or implementation of bus repair actions such as bitlane and/or segment sparing, the determination of one or more failing devices (e.g. memory and/or support device(s)) possibly with the invoking of device replacement (e.g. device "sparing"), parallel monitoring of subsystem operation or other purposes, etc. The one or more described buses would generally not be intended for primary use as high speed memory communication bus(es). Depending on the bus characteristics, the one or more bus(es) might, in addition to previously described functions, also provide a means by which the valid completion of operations and/or failure identification could be reported by the hub devices and/or memory module(s) to the memory controller(s), the processor, a service processor, a test device and/or other functional element permanently or temporarily in communication with the memory subsystem and/or hub device.

In other exemplary embodiments, performances similar to those obtained from point-to-point bus structures can be obtained by adding switch devices to the one or more communication bus(es). These and other solutions may offer increased memory packaging density at lower power, while otherwise retaining many of the characteristics of a point-to-point bus. Multi-drop busses provide an alternate solution, albeit often limiting the maximum operating frequency to a frequency lower than that available with the use of an optimized point-to-point bus structure, but at a cost/performance point that may otherwise be acceptable for many applications. Optical bus solutions may permit significantly increased frequency and bandwidth vs. the previously-described bus structures, using point-to-point or multi-drop or related structures, but may incur cost and/or space impacts when using contemporary technologies.

As used herein the term "buffer" or "buffer device" refers to an interface device which includes temporary storage circuitry (such as when used in a computer), especially one that accepts information at one rate (e.g. a high data rate) and delivers it another (e.g. a lower data rate), and vice versa. Data rate multipliers of 2:1, 4:1, 5:1, 6:1, 8:1, etc. may be utilized in systems utilizing one or more buffer device(s) such as those described herein, with such systems often supporting multiple data rate multipliers—generally on a per-port basis. In exemplary embodiments, a buffer is an electronic device that provides compatibility between two signals (e.g. one or more of changing voltage levels, converting data rates, etc.). The term "hub" may be used interchangeably with the term "buffer" in some applications. A hub is generally described as a device containing multiple ports that enable connection to one or more devices on each port. A port is a portion of an interface that serves a congruent I/O functionality (e.g., in the exemplary embodiment, a port may be utilized for sending and receiving information such as data, address, command and control information over one of the point-to-point links (which may further be comprised of one or more bus(es)), thereby enabling communication with one or more memory devices. A hub may further be described as a device that connects several systems, subsystems, or networks together, and may include logic to merge local data into a communication data stream passing through the hub device. A passive hub may simply forward messages, while an active hub, or repeater, may amplify, re-synchronize and/or refresh a stream of data (e.g. data packets) which otherwise would deteriorate in signal quality over a distance. The term hub device, as used herein, refers primarily to one or more active devices that also include logic (including hardware and/or software) for directly and/or indirectly connecting to and communicating with one or more memory device(s) utilizing one communication means to another communication means (e.g. one or more of an upstream and downstream bus and/or other bus structure). The hub device may further include one or more traditional "memory controller" functions such as the conversion of high-level address and/or commands into technology-specific memory device information, scheduling and/or re-ordering of memory operations, the inclusion of local data caching circuitry and/or include other traditional memory controller and/or memory system functions.

Also as used herein, the term "bus" refers to one of the sets of conductors (e.g., wires, printed circuit board traces or other connection means) between devices, cards, modules and/or other functional units. The data bus, address bus and control signals, despite their names, generally constitute a single bus since each are often useless without the others. A bus may include a plurality of signal lines, each signal line having two or more connection points that form a transmission path that enables communication between two or more transceivers, transmitters and/or receivers. The term "channel", as used herein, refers to the one or more busses containing information such as data, address(es), command(s) and control(s) to be sent to and received from a system or subsystem, such as a memory, processor or I/O system. Note that this term is often used in conjunction with I/O or other peripheral equipment; however the term channel has also been utilized to describe the interface between a processor or memory controller and one of one or more memory subsystem(s).

Further, as used herein, the term "daisy chain" refers to a bus wiring structure in which, for example, device A is wired to device B, device B is wired to device C, etc. . . . The last device is typically wired to a resistor or terminator. All devices may receive identical signals or, in contrast to a simple bus, each device may modify, re-drive or otherwise act upon one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. The terms daisy chain and cascade connect may be used interchangeably when a daisy chain structure includes some form of re-drive and/or "repeater" function. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors, optical carriers and/or other information transfer method, generally configured as a single carrier or as two or more carriers, in a twisted, parallel, or concentric arrangement, used to transport at least one logical signal.

Memory devices are generally defined as integrated circuits that are comprised primarily of memory (storage) cells, such as DRAMs (Dynamic Random Access Memories), SRAMs (Static Random Access Memories), FeRAMs (Ferro-Electric RAMs), MRAMs (Magnetic Random Access Memories), ORAMs (optical random access memories), Flash Memories and other forms of random access and/or pseudo random access storage devices that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs, QDR (Quad Data Rate) Synchronous DRAMs, Toggle-mode DRAMs or any of the expected follow-on devices such as DDR2, DDR3, DDR4 and related technologies such as Graphics RAMs, Video RAMs, LP RAMs (Low Power DRAMs) which are often based on at least a subset of the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package and/or or integrated onto a single device—based on technology, power, space, cost and other tradeoffs. In addition, one or more of the various passive devices such as resistors, capacitors may be integrated into the support chip packages and/or into the substrate, board or raw card itself, based on technology, power, space, cost and other tradeoffs. These packages may also include one or more heat sinks or other cooling enhancements, which may be further attached to the immediate carrier or be part of an integrated heat removal structure that contacts more than one support and/or memory devices.

Memory devices, hubs, buffers, registers, clock devices, passives and other memory support devices and/or components may be attached to the memory subsystem via various methods including solder interconnects, conductive adhesives, socket assemblies, pressure contacts and other methods which enable communication between the two or more devices and/or carriers via electrical, optical or alternate communication means.

The one or more memory modules, memory cards and/or alternate memory subsystem assemblies and/or hub devices may be electrically connected to the memory system, processor complex, computer system or other system environment via one or more methods such as soldered interconnects, connectors, pressure contacts, conductive adhesives, optical interconnects and other communication and power delivery methods. Inter-connection systems may include mating connectors (e.g. male/female connectors), conductive contacts and/or pins on one carrier mating with a compatible male or female connection means, optical connections, pressure contacts (often in conjunction with a retaining mechanism) and/or one or more of various other communication and power delivery methods. The interconnection(s) may be disposed along one or more edges of the memory assembly, may include one or more rows of interconnections and/or be located a distance from an edge of the memory subsystem depending on such application requirements as the connection structure, the number of interconnections required, performance requirements, ease of insertion/removal, reliability, available space/volume, heat transfer/cooling, component size and shape and other related physical, electrical, optical, visual/physical access, etc. Electrical interconnections on contemporary memory modules are often referred to as contacts, pins, tabs, etc. Electrical interconnections on a contemporary electrical connector are often referred to as contacts, pads, pins, pads, etc.

As used herein, the term memory subsystem refers to, but is not limited to one or more memory devices, one or more memory devices and associated interface and/or timing/control circuitry and/or one or more memory devices in conjunction with a memory buffer, hub device, and/or switch. The term memory subsystem may also refer to a storage function within a memory system, comprised of one or more memory devices in addition to one or more supporting interface devices and/or timing/control circuitry and/or one or more memory buffers, hub devices or switches, identification devices, etc.; generally assembled onto one or more substrate(s), card(s), module(s) or other carrier type(s), which may further include additional means for attaching other devices. The memory modules described herein may also be referred to as memory subsystems because they include one or more memory devices and other supporting device(s).

Additional functions that may reside local to the memory subsystem and/or hub device include write and/or read buffers, one or more levels of local memory cache, local pre-fetch logic (allowing for self-initiated pre-fetching of data), data encryption/decryption, compression/de-compression, address and/or command protocol translation, command prioritization logic, voltage and/or level translation, error detection and/or correction circuitry on one or more busses, data scrubbing, local power management circuitry (which may further include status reporting), operational and/or status registers, initialization circuitry, self-test circuitry (testing logic and/or memory in the subsystem), performance monitoring and/or control, one or more co-processors, search engine(s) and other functions that may have previously resided in the processor, memory controller or elsewhere in the memory system. Memory controller functions may also be included in the memory subsystem such that one or more of non-technology-specific commands/command sequences, controls, address information and/or timing relationships can be passed to and from the memory subsystem, with the subsystem completing the conversion, re-ordering, re-timing between the non-memory technology-specific information and the memory technology-specific communication means as necessary. By placing more technology-specific functionality local to the memory subsystem, such benefits as improved performance, increased design flexibility/extendibility, etc., may be obtained, often while making use of unused circuits within the subsystem.

Memory subsystem support device(s) may be directly attached to the same substrate or assembly onto which the memory device(s) are attached, or may be mounted to a separate interposer, substrate, card or other carrier produced using one or more of various plastic, silicon, ceramic or other materials which include electrical, optical or other communication paths to functionally interconnect the support device(s) to the memory device(s) and/or to other elements of the memory subsystem or memory system.

Information transfers (e.g. packets) along a bus, channel, link or other interconnection means may be completed using one or more of many signaling options. These signaling options may include one or more of such means as single-ended, differential, optical or other communication methods, with electrical signaling further including such methods as voltage and/or current signaling using either single or multi-level approaches. Signals may also be modulated using such methods as time or frequency, non-return to zero, phase shift keying, amplitude modulation and others. Signal voltage levels are expected to continue to decrease, with 1.5V, 1.2V, 1V and lower signal voltages expected, as a means of reducing power, accommodating reduced technology breakdown voltages, etc.—in conjunction with or separate from the power supply voltages. One or more power supply voltages, e.g. for DRAM memory devices, may drop at a slower rate that the I/O voltage(s) due in part to the technological challenges of storing information in the dynamic memory cells.

One or more clocking methods may be utilized within the memory subsystem and the memory system itself, including global clocking, source-synchronous clocking, encoded clocking or combinations of these and other methods. The clock signaling may be identical to that of the signal (often referred to as the bus "data") lines themselves, or may utilize one of the listed or alternate methods that is more conducive to the planned clock frequency(ies), and the number of clocks required for various operations within the memory system/subsystem(s). A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the memory subsystem and/or may be based on a clock that is derived from the clock included as part of the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and/or other functional, configuration or related operations. Information passing from the memory subsystem(s) may include any or all of the information passing to the memory subsystem(s), however generally will not include address and command information. The information passing to or from the memory subsystem(s) may be delivered in a manner that is consistent with normal memory device interface specifications (generally parallel in nature); however, all or a portion of the information may be encoded into a 'packet' structure, which may further be consistent with future memory interfaces or delivered using an alternate method to achieve such goals as an increase communication bandwidth, an increase in memory subsystem reliability, a reduction in power and/or to enable the memory subsystem to operate independently of the memory technology. In the latter case, the memory subsystem (e.g. the hub device) would convert and/or schedule, time, etc. the received information into the format required by the receiving device(s).

Initialization of the memory subsystem may be completed via one or more methods, based on the available interface busses, the desired initialization speed, available space, cost/complexity, the subsystem interconnect structures involved, the use of alternate processors (such as a service processor) which may be used for this and other purposes, etc. In one embodiment, the high speed bus may be used to complete the initialization of the memory subsystem(s), generally by first completing a step-by-step training process to establish reliable communication to one, more or all of the memory subsystems, then by interrogation of the attribute or 'presence detect' data associated the one or more various memory assemblies and/or characteristics associated with any given subsystem, and ultimately by programming any/all of the programmable devices within the one or more memory subsystems with operational information establishing the intended operational characteristics for each subsystem within that system. In a cascaded system, communication with the memory subsystem closest to the memory controller would generally be established first, followed by the establishment of reliable communication with subsequent (downstream) subsystems in a sequence consistent with their relative position along the cascade interconnect bus.

A second initialization method would include one in which the high speed bus is operated at one frequency during the initialization process, then at a second (and generally higher) frequency during the normal operation. In this embodiment, it may be possible to initiate communication with any or all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic and/or other methods such as a power-on-rest detection via detection of a slow command identifying that function.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also provides an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) may facilitate increased function on integrated devices as well as the integration of functions previously implemented on separate devices. This integration can serve to improve overall performance of the memory system and/or subsystem(s), as well as provide such system benefits as increased storage density, reduced power, reduced space requirements, lower cost, higher performance and other manufacturer and/or customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths and/or portions of such paths (e.g. "segments" of end-to-end "bitlanes") between a given memory subsystem and the memory controller to replace failing paths and/or portions of paths, complement-re-complement techniques and/or alternate reliability enhancement methods as used in computer, communication and related systems.

The use of bus termination, on busses ranging from point-to-point links to complex multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage (such voltage directly sourced to the device(s) or indirectly sourced to the device(s) from a voltage divider, regulator or other means), or another signal. The termination device(s) may be part of a passive or active termination structure, and may reside in one or more positions along one or more of the signal lines, and/or as part of the transmitter and/or receiving device(s). The terminator may be selected to match the impedance of the transmission line, be selected as an alternate impedance to maximize the useable frequency, signal swings, data widths, reduce reflections and/or otherwise improve operating margins within the desired cost, space, power and other system/subsystem limits.

Technical effects and benefits include providing error correcting code protected quasi-static bit communication on a high-speed bus. The error correcting code can both detect and correct errors on received SBC commands. When incorporated in a cascade interconnected memory system, transmitting and receiving logic supporting SBC can be included in memory hub devices and a memory controller to pass training information between memory modules at a slower speed relative to the nominal operation at high-speed. Using a detection scheme for identifying that a sufficient number of signals have remained static for a pre-determined period of time allows SBC data to be sampled in parallel to high-speed data and distinguished from the high-speed data. ECC protection as well as the ability to use spare lanes provides enhanced error protection. Since the SBC clock is a slower clock derived from a high speed clock, sampling of SBC data is less susceptible to precision issues with timing as compared with the high-speed data, and thus can be reliable without requiring PLL adjustments and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A memory buffer comprising:
a bus interface to links in a high-speed channel for communicating with a memory controller via a direct connection or via a cascade interconnection through another memory buffer, the interface operable in a static bit communication (SBC) mode and a high-speed mode;
a field service interface (FSI) slave for receiving FSI signals from a FSI master; and
logic for executing a power-on and initialization training sequence initiated by the memory controller, the sequence including:
initializing the links of the high-speed channel;
a power-on reset that relies on stand-by voltage rails and is controlled by the signals received by the FSI slave; and
handshaking to the memory buffer or to the memory controller, all or a portion of the handshaking performed in the SBC mode.

2. The memory buffer of claim 1 wherein the high-speed channel includes a plurality of clock signals and the sequence further includes a training state to implement clock detection, test and repair.

3. The memory buffer of claim 1 wherein the sequence further includes memory buffer configuration and memory channel DC (direct current) calibration.

4. The memory buffer of claim 1 wherein the sequence further includes entering the SBC mode, testing downstream data lanes in the links by analyzing a PRBS (pseudo random bit sequence) pattern, and detecting and repairing faulty lanes by returning a lane repair vector.

5. The memory buffer of claim 1 wherein the sequence further includes entering the SBC mode, testing upstream data lanes in the links by analyzing a PRBS pattern, and detecting and repairing faulty lanes by returning a lane repair vector.

6. The memory buffer of claim 1 wherein the sequence further includes performing packet de-skewing in bus receivers using scrambled data from the high-speed channel and FIFO (first-in-first-out) read/write pointer alignment and optimization.

7. The memory buffer of claim 1 wherein the bus interface includes one or more receivers and the sequence further includes performing packet alignment using phase correction in the bus receivers.

8. The memory buffer of claim 1 wherein the sequence further includes implementing frame lock and synchronizing a memory device clock to a memory channel clock for a programmed frequency ratio.

9. The memory buffer of claim 1 further comprising a memory device interface, wherein a sequence of one or both of FSI commands and memory controller commands are used to initialize the memory device interface.

10. The memory buffer of claim 9 wherein the memory device interface initialization includes one or more of:
   calibrating a memory delay line;
   resetting and initializing memory devices and a register control device;
   optimizing read data delay;
   de-skewing read data;
   centering a read data strobe; and
   calibrating write data strobe delays using write leveling.

11. The memory buffer of claim 1 wherein the sequence includes specific procedures for channel repair and re-initialization, including a clock repair training state.

12. The memory buffer of claim 11 wherein the re-initialization is speeded up by skipping the clock repair training state.

13. The memory buffer of claim 1 wherein the memory buffer supports modes of repeated initial program load (IPL) without powering off voltages.

14. The memory buffer of claim 13 wherein the modes of repeated IPL are supported while preserving memory content.

15. A high reliability cascade interconnect memory system comprising:
   a memory controller, the memory controller including logic for initiating a power- on and initialization training sequence for the memory system, the sequence including a plurality of training states and utilizing a static bit communication (SBC) protocol for at least a portion of controlling the training states and handshaking between the memory controller and one or more memory buffers in the cascade interconnect memory system;
   a high-speed channel in communication with the memory controller, the high- speed channel including a plurality of links that are initialized by a plurality of training states; and
   a memory buffer in communication with a plurality of memory devices and in communication with the high speed channel for communicating with the memory controller via direct connection or via a cascade interconnection through another memory buffer, the memory buffer including a field service interface (FSI) slave for receiving FSI signals from a FSI master and logic for executing all or a portion of the power-on and initialization sequence, the sequence including a power-on reset that relies on stand-by voltage rails and is controlled by the signals received by the FSI slave.

16. The memory system of claim 15 further comprising at least one more high speed channel and at least one more memory buffer cascade interconnected to the memory controller and the memory buffer, wherein the sequence includes calculating a read data latency for each of several chains of cascaded memory buffers and correcting any inter-channel skew, thereby enabling lock-step operation of multiple parallel memory channels.

17. A method for executing power-on initialization and test at a memory buffer, the method comprising:
   receiving a power-on and initialization sequence at a memory buffer from a memory controller, the memory controller and the memory buffer in a cascade interconnect memory system, the memory buffer including a bus interface operable in a static bit communication (SBC) or high-speed mode to links in a high-speed channel for communicating with the memory controller via a direct connection or via a cascade interconnection through another memory buffer in the memory system; and
   executing the sequence, the executing including:
      initializing the links of the high speed channel;
      performing a power on-reset that relies on stand-by voltage rails and is controlled by signals received by a FSI slave; and
      handshaking to the other memory buffer or to the memory controller, all or a portion of the handshaking performed in the SBC mode.

18. The method of claim 17 wherein the sequence includes specific procedures for channel repair and re-initialization, including a clock repair training state.

19. The method of claim 17 wherein the re-initialization is speeded up by skipping the clock repair training state.

* * * * *